(12) United States Patent  
Nakata

(10) Patent No.: US 12,131,574 B2  
(45) Date of Patent: Oct. 29, 2024

(54) ELECTRONIC EQUIPMENT

(71) Applicant: Sony Semiconductor Solutions Corporation, Kanagawa (JP)

(72) Inventor: Masashi Nakata, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 17/802,442

(22) PCT Filed: Feb. 18, 2021

(86) PCT No.: PCT/JP2021/006197  
§ 371 (c)(1),  
(2) Date: Aug. 25, 2022

(87) PCT Pub. No.: WO2021/199769  
PCT Pub. Date: Oct. 7, 2021

(65) Prior Publication Data  
US 2023/0144032 A1  May 11, 2023

(30) Foreign Application Priority Data  
Mar. 30, 2020 (JP) .................. 2020-061485

(51) Int. Cl.  
*G06V 40/13* (2022.01)  
*G06Q 20/40* (2012.01)  
(Continued)

(52) U.S. Cl.  
CPC ... *G06V 40/1318* (2022.01); *G06Q 20/40145* (2013.01); *G06V 10/143* (2022.01);  
(Continued)

(58) Field of Classification Search  
CPC ............ G06V 40/1318; G06V 10/143; G06V 40/1335; G06V 40/1365; G06V 40/67;  
(Continued)

(56) References Cited

U.S. PATENT DOCUMENTS

2012/0258773 A1  10/2012  Alvarez Rivera  
2015/0028189 A1   1/2015  Hagiwara  
(Continued)

FOREIGN PATENT DOCUMENTS

JP  H07334646 A  12/1995  
JP  2008006146 A   1/2008  
(Continued)

OTHER PUBLICATIONS

International Search Report (PCT/ISA/210), International Application No. PCT/JP2021/006197, dated May 11, 2021.

*Primary Examiner* — Abhishek Sarma  
(74) *Attorney, Agent, or Firm* — Michael Best & Friedrich LLP

(57) ABSTRACT

Implementing fingerprint authentication during a swipe motion on a display.

Electronic equipment includes a display and an optical fingerprint sensor. The display includes a display surface including light-emitting pixels in an array in a first direction and a direction intersecting the first direction. The optical fingerprint sensor includes as imaging element including light-receiving elements in an array in the first direction and the second direction on a side opposite to the display surface of the display in a third direction intersecting the first direction and the second direction, and each of the light-receiving elements transfers a photoelectrically converted charge at the same timing.

17 Claims, 14 Drawing Sheets

(51) Int. Cl.
*G06V 10/143* (2022.01)
*G06V 40/10* (2022.01)
*G06V 40/12* (2022.01)
*G06V 40/60* (2022.01)
*H10K 50/86* (2023.01)
*H10K 59/40* (2023.01)
*H10K 59/65* (2023.01)

(52) U.S. Cl.
CPC ...... *G06V 40/1335* (2022.01); *G06V 40/1365* (2022.01); *G06V 40/67* (2022.01); *H10K 50/86* (2023.02); *H10K 59/40* (2023.02); *H10K 59/65* (2023.02); *G06V 40/15* (2022.01)

(58) Field of Classification Search
CPC ............. G06V 40/15; G06Q 20/40145; G06Q 30/0641; G06Q 30/0601; H10K 50/86; H10K 59/40; H10K 59/65; G06F 1/1684; G06F 3/04883; G06F 21/32; G06F 3/0488; H04N 23/60; H04N 25/00
See application file for complete search history.

(56) References Cited

U.S. PATENT DOCUMENTS

| | | |
|---|---|---|
| 2018/0074627 A1 | 3/2018 | Kong |
| 2019/0051709 A1* | 2/2019 | Puszka ................ H10K 59/60 |
| 2019/0228139 A1* | 7/2019 | Oh ........................ G06V 40/13 |

FOREIGN PATENT DOCUMENTS

| | | |
|---|---|---|
| JP | 2009064262 A | 3/2009 |
| JP | 2015023250 A | 2/2015 |
| JP | 2017538225 A | 12/2017 |
| JP | 2019070790 A | 5/2019 |
| JP | 2019128961 A | 8/2019 |

* cited by examiner

FIG. 1
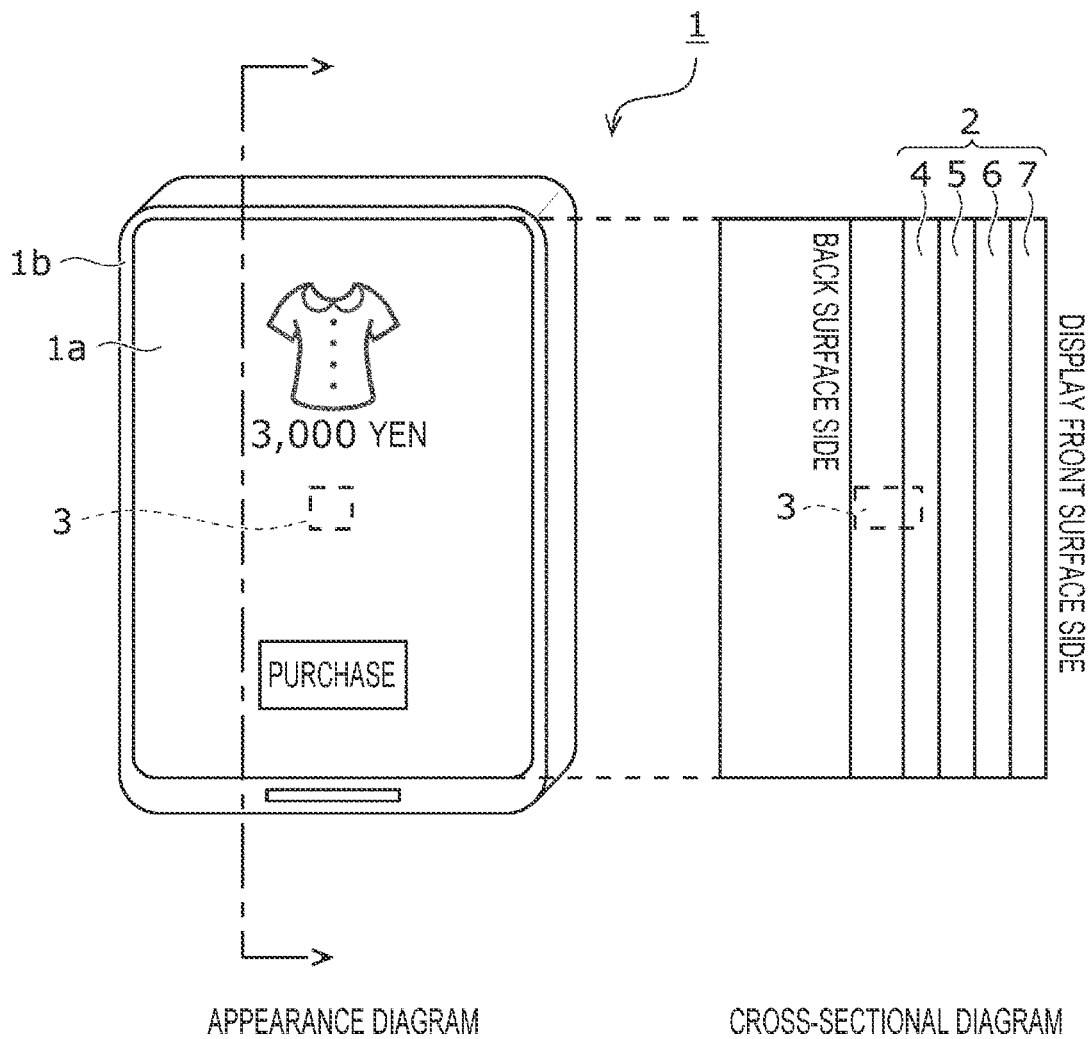
APPEARANCE DIAGRAM  CROSS-SECTIONAL DIAGRAM
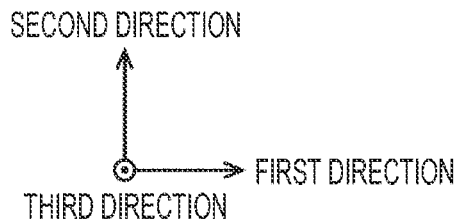
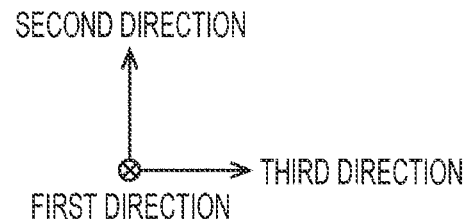

FIG. 2
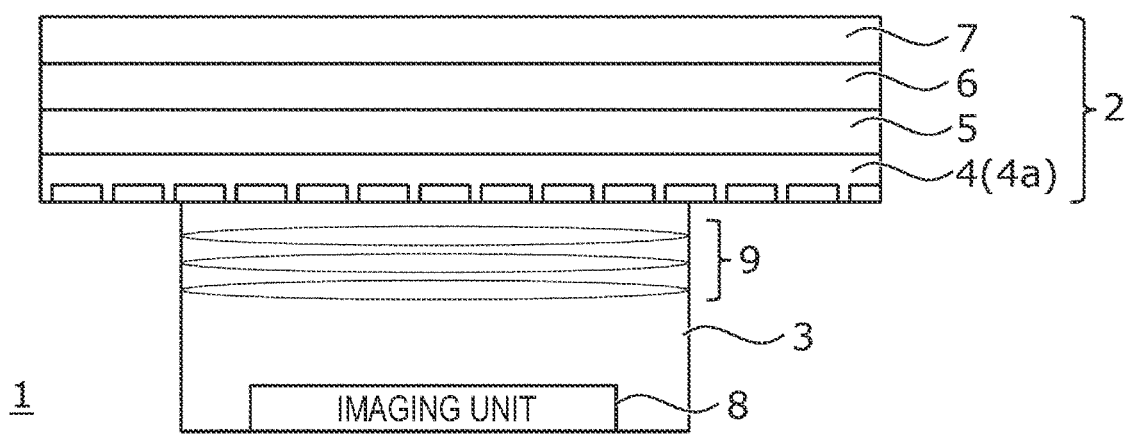
THIRD DIRECTION

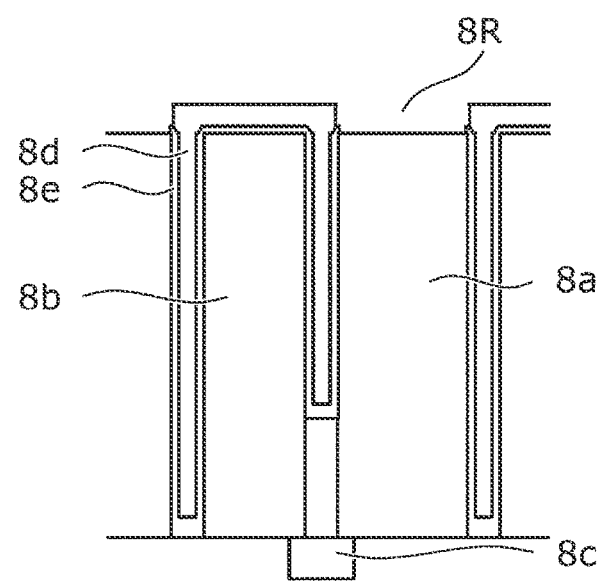
FIG. 5A
THIRD DIRECTION

FIG. 5B
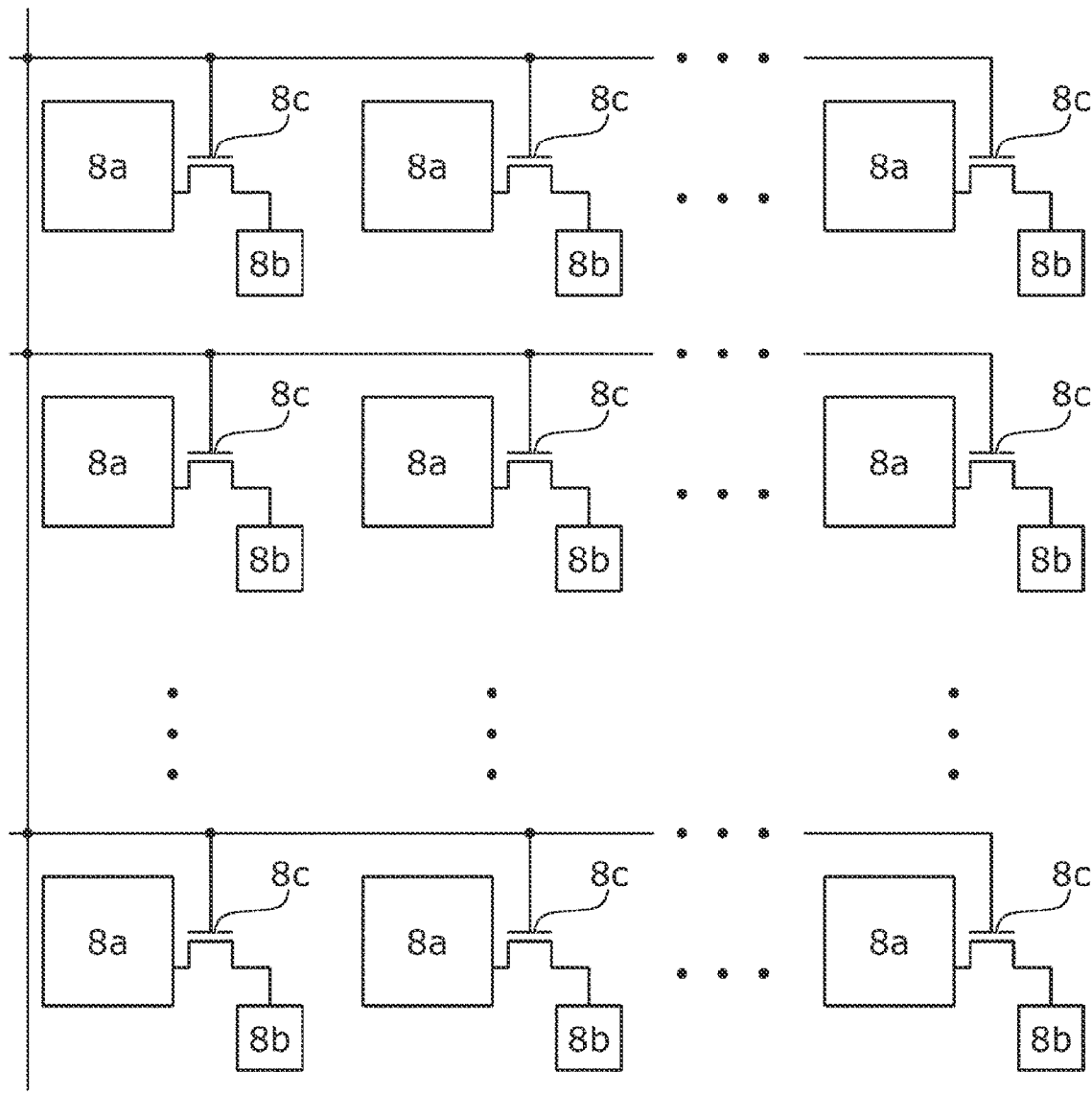
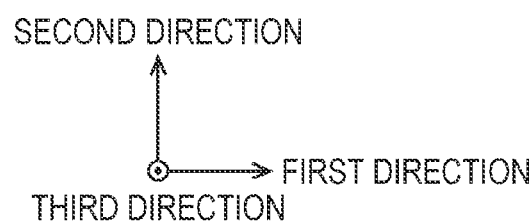

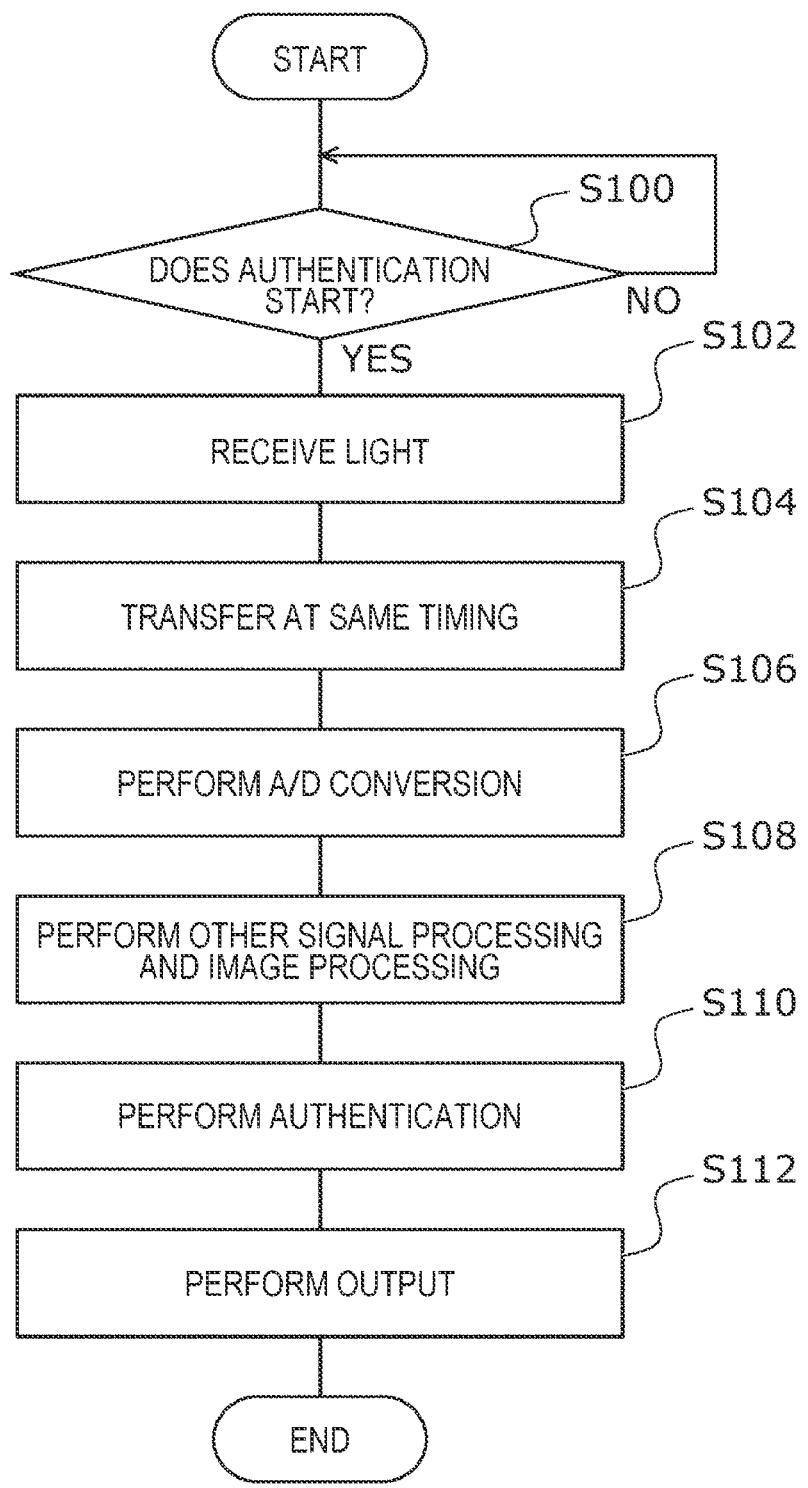

ELECTRONIC EQUIPMENT

TECHNICAL FIELD

The present disclosure relates to electronic equipment.

BACKGROUND ART

In an optical fingerprint sensor, it is necessary to stop a finger for a predetermined time at the time of acquiring the fingerprint, and the convenience is low from the viewpoint of the UI. Furthermore, in a terminal logged in by fingerprint authentication, a subsequent operation is often possible without performing fingerprint authentication or the like. For example, it is often possible to perform shopping by credit card payment from a browser after performing personal authentication by fingerprint once, and there is also a security problem.

CITATION LIST

Patent Document

Patent Document 1: US 2012/0258773 A

SUMMARY OF THE INVENTION

Problems to be Solved by the Invention

One aspect of the present disclosure provides electronic equipment that implements fingerprint authentication during a swipe motion on a display.

Solutions to Problems

According to an embodiment, the electronic equipment includes a display and an optical fingerprint sensor. The display includes a display surface including light-emitting pixels in an array in a first direction and a direction intersecting the first direction. The optical fingerprint sensor includes an imaging element including light-receiving elements in an array in the first direction and the second direction on a side opposite to the display surface of the display in a third direction intersecting the first direction and the second direction, and each of the light-receiving elements transfers a photoelectrically converted charge at the same timing.

The imaging element may include pixel memory that temporarily stores light reception information of each of the light-receiving elements, and transfer of information from the light-receiving element to the pixel memory may be executed at the same timing.

Transfer of information from the light-receiving element to the pixel memory may be executed by applying a transfer control signal to a transfer transistor that transfers charges stored in the light-receiving element to the pixel memory at the same timing.

An information processing unit that executes information processing of fingerprint information read by the imaging element may be further included.

The information processing unit may read the fingerprint information during an operation including at least a swipe motion of a finger.

A touch panel that senses contact information with respect to the display may be further included, and a velocity of the swipe motion may be estimated on the touch panel.

The information processing unit may estimate a velocity of the swipe motion on the basis of information read by the imaging element.

An instruction to slow down the speed of the swipe motion may be output on the basis of required authentication accuracy.

The instruction of the speed of the swipe motion may be output to the display.

The instruction may display a speed guide on the display.

In a case where the speed is faster than a predetermined speed, the fact that the speed is too fast may be output.

An output indicating that the speed is too fast may be at least one of an output to the display, an output with a sound, or an output with vibration.

The information processing unit may shorten an exposure time of the optical fingerprint sensor in a case where the speed is faster than a predetermined speed.

The information processing unit may generate authentication information from the fingerprint information captured at different times.

The light-emitting pixel may output light of different wavelengths on the display surface side of the light-receiving element, and the light-receiving element may acquire the fingerprint information on the basis of reflected light of different wavelengths.

A polarizing filter may be further included between the light-receiving element and the display surface, and the light-receiving element may sense polarized light via the polarizing filter.

A filter that acquires a state of hemoglobin may be further included between the light-receiving element and the display surface, and the information processing unit may acquire information of the hemoglobin and perform biometric authentication.

The information processing unit may perform biometric authentication on the basis of information of a temporal shape change of a finger in contact with the display surface.

The light-receiving element may detect the swipe motion of a plurality of fingers.

The information processing unit may execute the fingerprint authentication using a combination of the plurality of fingers in the swipe motion of the plurality of fingers.

A combination of the plurality of fingers may vary on the basis of required authentication accuracy.

The information processing unit may detect finger information and accumulate the fingerprint information during execution of authentication or during a time where authentication is not executed.

The information processing unit may accumulate a change of a finger and enhance authentication accuracy.

The information processing unit may acquire and accumulate the fingerprint information of a finger other than a non-registered finger.

The number of light-receiving elements in a direction intersecting a direction of the swipe motion may be larger than the number of light-receiving elements in the direction of the swipe motion.

The number of light-receiving elements in the direction intersecting the direction of the swipe motion may be more than twice the number of light-receiving elements in the direction of the swipe motion.

A guide of execution of the swipe motion in a direction intersecting a direction in which the large number of the light-receiving elements are provided may be displayed on the display.

An interface that displays, on the display, a region including the light-receiving element, disposes product information and a purchase button so as to pass through the region, and enables purchase of the product by the swipe motion of the product information from the product information to the purchase button may be further included, and the purchase information may be transmitted to a server on the basis of a result of the fingerprint authentication.

A dynamic object may be displayed on the display so as to include a region including the light-receiving element.

The object may change in shape when touched by a user's finger.

The object may change in light-emitting state when touched by a user's finger.

The light-emitting state may change to be suitable for acquisition of the fingerprint information.

The object may dynamically change on the basis of an acquisition status of the fingerprint information or a personal authentication status after a user's finger passes over.

An inclination detection unit that detects an inclination of the display from a horizontal direction may be further included, and authentication of the fingerprint information may be executed on the basis of the inclination detected by the inclination detection unit.

BRIEF DESCRIPTION OF DRAWINGS

FIG. 1 is a diagram schematically illustrating electronic equipment according to an embodiment.

FIG. 2 is a diagram schematically illustrating a cross-sectional diagram of electronic equipment according to an embodiment.

FIG. 5A is a diagram schematically illustrating a light-receiving pixel according to an embodiment.

FIG. 5B is a diagram schematically illustrating connection of light-receiving pixels according to an embodiment.

FIG. 6 is a flowchart illustrating processing of personal authentication according to an embodiment.

MODE FOR CARRYING OUT THE INVENTION

Figure 3:
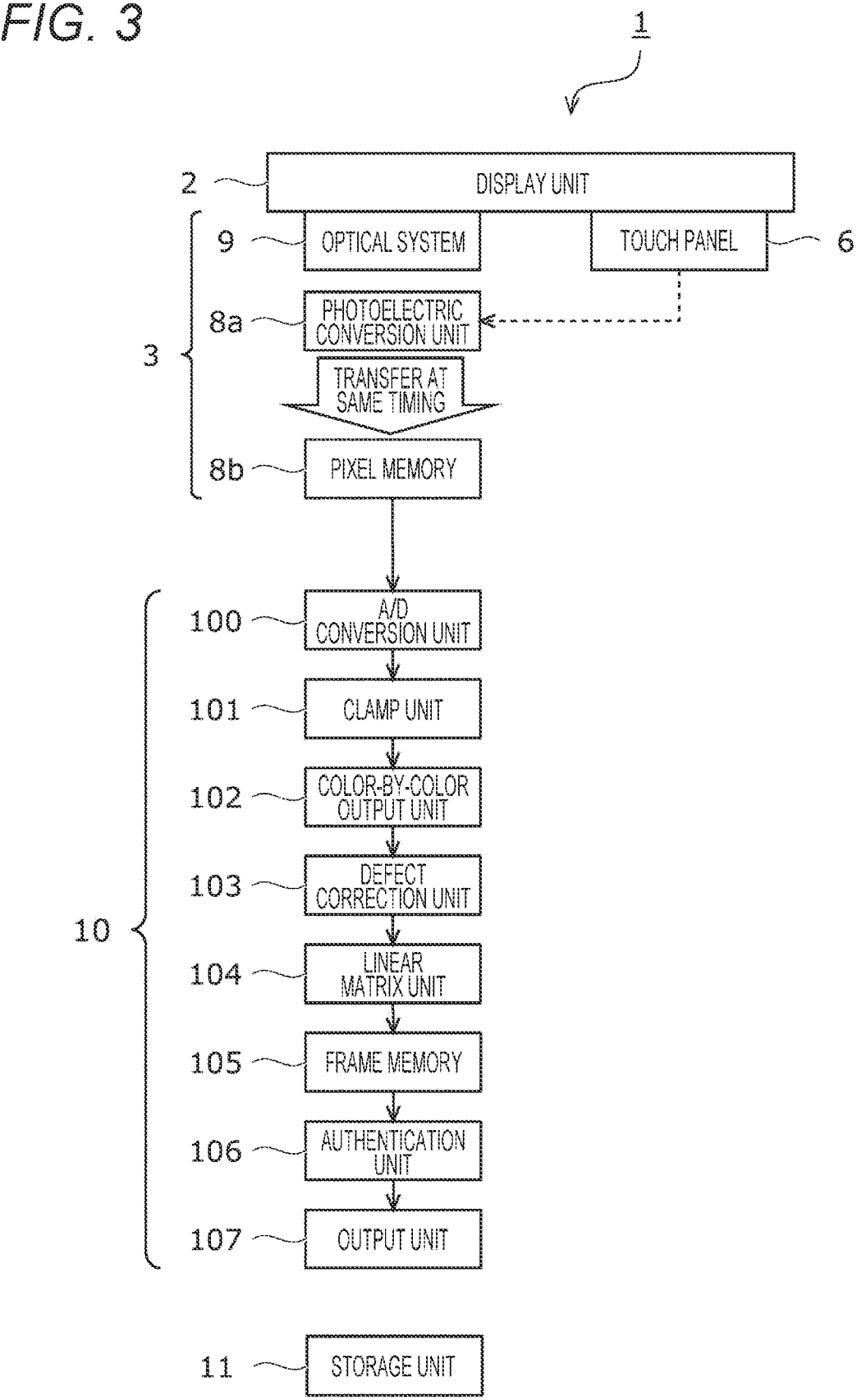
FIG. 3 is a block diagram illustrating an example of a configuration of electronic equipment according to an embodiment.

Embodiments of the electronic equipment are described below with reference to the drawings. Although main components of the electronic equipment will be mainly described below, the electronic equipment may have components and functions that are not illustrated or described. The description described below does not exclude components or functions that are not illustrated or described. Furthermore, there are cases where the size, shape, aspect ratio, and the like are changed for the sake of description, but these have an appropriate size, shape, aspect ratio, and the like in mounting.

Note that, in the description described below, a signal to be acquired is described as image information or imaging information, but the image information and the imaging information are concepts in a broad sense, and are concepts including an image of one frame in a still image, a moving image, or a video. Furthermore, "larger" and "smaller" may be read as "equal to or more" and "equal to or less than", respectively.

First Embodiment

FIG. 1 is a diagram schematically illustrating electronic equipment according to an embodiment. Furthermore, FIG. 2 is a diagram schematically illustrating a cross section of electronic equipment according to an embodiment. Electronic equipment 1 is any device having a display function and an imaging function, for example, a smartphone, a mobile phone, a tablet terminal, a personal computer, or the like.

The electronic equipment 1 includes a display unit 2 and a camera module 3. As can be seen in the left diagram of FIG. 1, a display screen 1a expands to be close to the outer size of the electronic equipment 1, and the width of a bezel 1b around the display screen 1a can be set to, for example, several millimeters or less. A fingerprint authentication unit is often provided in the bezel 1b of the electronic equipment 1, but in the present embodiment, the camera module 3 is provided in the display screen 1a as indicated by the dotted line. As illustrated in the left diagram, the width of the bezel 1b can be narrowed by providing the camera module 3 that performs imaging for fingerprint authentication on the back surface side of the display screen 1a.

Note that, in FIG. 1, the camera module 3 is disposed on the back surface side of substantially the center of the display screen 1a, but the position is not limited to this diagram as long as it is the back surface of the display screen 1a. For example, the camera module 3 may be disposed near a peripheral portion of the display screen 1a, or may be disposed below the center in the right diagram. Furthermore, although it is disposed at one place in the diagram, the disposition place may be not one place but a plurality of places. Furthermore, in this diagram, the display unit 2 and the camera module 3 are provided on one surface of the electronic equipment 1, but it is not limited thereto. For example, the display unit 2 and the camera module 3 may be provided on both surfaces of the electronic equipment 1.

The display unit 2 is a structural body in which a display panel 4, a circularly polarizing plate 5, a touch panel 6, and cover glass 7 are stacked as a display optical system. Note that the arrangement of them is not limited, and they may be appropriately interchanged, two or more of the same configurations may exist, or another configuration may be included.

The display panel 4 may include, for example, organic light emitting diodes (OLED), liquid crystal, micro LEDs, or light-emitting elements based on another display principle in an array. For example, the light-emitting elements are provided in an array in a plane including a first direction and a second direction. The display panel 4 such as an OLED includes a plurality of layers. A member having a low transmittance such as a color filter layer or the like is often disposed in the display panel 4. As described later, a through-hole may be formed in the member having a low transmittance in the display panel 4 in accordance with the place of disposition of the camera module 3. When the subject light passing through the through-hole is made incident on the camera module 3, the image quality of the image captured by the camera module 3 can be improved.

The circularly polarizing plate 5 is provided to reduce glare, enhance visibility of the display screen 1a even in a bright environment, or the like. A touch sensor is incorporated in the touch panel 6. There are various types of touch sensors such as a capacitive type, a resistive film type, and a pressure-sensitive type, but any type may be used. Furthermore, the touch panel 6 and the display panel 4 may be integrated. The cover glass 7 is provided to protect the display panel 4 and the like. Each of these elements may be bonded by an adhesive that is less optically susceptible.

The camera module 3 includes an imaging unit 8 and an optical system 9. The optical system 9 is disposed on the light incident surface side of the imaging unit 8, that is, on the side close to the display unit 2, and condenses the light passing through the display unit 2 on the imaging unit 8. The optical system 9 may include one or a plurality of lenses. For example, the imaging unit 8 operates as an optical fingerprint sensor to acquire fingerprint information of the user.

The imaging unit 8 operating as an optical fingerprint sensor includes a plurality of photoelectric conversion units. A lens is disposed in each photoelectric conversion unit. This lens causes the photoelectric conversion unit constituting each pixel to receive light appropriately emitted to the imaging unit 8 by the optical system 9. The photoelectric conversion unit photoelectrically converts the light incident through the display unit 2. The photoelectric conversion unit may be a complementary metal-oxide-semiconductor field-effect transistor (CMOS) sensor or a charge coupled device (CCD) sensor. The photoelectric conversion units are provided, for example, in an array on a plane including the first direction and the second direction. Further, the photoelectric conversion units may be provided in an array along the first direction and the second direction. For example, light-receiving elements of the photoelectric conversion units are provided as light-receiving pixels in an array along the same orientation as light-emitting pixels of the display unit.

Furthermore, the photoelectric conversion unit may include a photodiode or an organic photoelectric conversion film. The plurality of photoelectric conversion units can be arrayed in any manner. The method for arraying the plurality of photoelectric conversion units may be, for example, a Bayer array, an interline array, a checkered array, a stripe array, or another array.

In the present disclosure, an output value of the photoelectric conversion unit or a value subjected to predetermined conversion on the basis of the output value is referred to as a light-receiving pixel value.

In the present embodiment, fingerprint information of the user is acquired at a timing when a finger passes by a region of the display where the camera module 3 is present, and personal authentication is executed using the fingerprint information. For example, as illustrated in the left diagram of FIG. 1, in a case where product information and a purchase button are displayed on the display, the camera module 3 acquires the fingerprint information from the finger swiping, flicked, wiping, or the like at the timing of dragging the image of a product to the purchase button. This acquisition is executed using a global shutter as described later. Furthermore, the camera module 3 executes the operation of the global shutter in an appropriate exposure time.

FIG. 3 is a diagram illustrating an example of a block diagram of the electronic equipment 1 according to the present embodiment. The inside of the display unit 2 illustrated in FIGS. 1 and 2 is omitted. The electronic equipment 1 outputs information from the camera module 3 and the touch panel 6 described above and includes an information processing unit 10 that executes this information processing, and a storage unit 11.

In order to implement the operation of the global shutter described above, the imaging unit 8 of the camera module 3 includes a photoelectric conversion unit 8a (photoelectric conversion element) and pixel memory 8b corresponding to each photoelectric conversion unit 8a. The information sensed by the photoelectric conversion unit 8a is transferred to the corresponding pixel memory 8b at the same timing. Then, the light reception result is output from the pixel memory 8b to the information processing unit 10 at any timing.

The information processing unit 10 is configured to include, for example, a central processing unit (CPU), an application specific integrated circuit (ASIC), a field programmable gate array (FPGA), or the like. As described below, the information processing unit 10 may be divided into blocks that perform some or all of various operations, or information processing by software may be specifically implemented by the CPU for some or all of the operations.

The storage unit 11 includes, for example, various memories, storages, and the like. For example, information such as programs and data necessary for the operation of the electronic equipment 1 may be non-temporarily stored in the storage unit 11. Furthermore, the memory may include a temporary storage region such as a cache region.

The information processing unit 10 includes an A/D conversion unit 100, a clamp unit 101, a color-by-color output unit 102, a defect correction unit 103, a linear matrix unit 104, frame memory 105, an authentication unit 106, and an output unit 107. The frame memory 105 may be provided as a part of the storage unit 11 instead of the information processing unit 10.

The A/D conversion unit 100 converts data received and converted by the photoelectric conversion unit 8a, that is, an analog signal stored in the pixel memory 8b at a predetermined timing into a digital signal for each pixel. The A/D conversion unit 100 outputs the converted digital signal as image data.

For example, the clamp unit 101 specifies a black level, subtracts the specified black level from the image data output from the A/D conversion unit 100, and outputs the image data. The clamp unit 101 may set the ground level for each photoelectric conversion element included in the pixel, and in this case, the ground correction of a signal value is executed on the basis of the acquired ground level set for each photoelectric conversion element.

For example, in a case where the photoelectric conversion unit 8a acquires an analog signal for each color, the color-by-color output unit 102 outputs the data of a subpixel image for each color. The photoelectric conversion unit 8a includes, for example, color filters of R (red), G (green), and B (blue). Each photoelectric conversion unit 8a outputs the sensing information for each color using these filters or the like. Instead of being provided with a color filter in the photoelectric conversion unit 8a, the photoelectric conversion unit 8a may acquire an analog signal for each color using the organic photoelectric conversion film.

The clamp unit 101 adjusts the ground level on the basis of these filters, and the color-by-color output unit 102 outputs the signal output from the clamp unit 101 for each color. No color information is added to the analog signal acquired by the photoelectric conversion unit 8a. Hence, the color-by-color output unit 102 may store data regarding colors disposed for each light-receiving element in the photoelectric conversion unit 8a, and may perform output for each color on the basis of the data.

Note that the photoelectric conversion unit 8a may include, for example, an element that receives near-infrared light, a filter that acquires a complex spectrum such as a plasmon filter, or the like. In these cases, it is difficult to express the information simply as color information, but the color-by-color output unit 102 may process the information in association with wavelength information as long as the information can be classified by the wavelength of light. In such a case, the color-by-color output unit 102 may process the wavelength information as information having a range.

The defect correction unit 103 executes correction of a defect in the image data. The defect of the image data occurs, for example, due to a defective pixel or defective information due to a defect of the photoelectric conversion element provided in the pixel, or due to information loss due to light saturation in the optical system 9. The defect correction unit 103 may execute defect correction processing by performing interpolation on the basis of, for example, information of surrounding pixels or information of peripheral pixels having the same color information.

The linear matrix unit 104 performs color reproduction by executing matrix operation on the color information. For example, the linear matrix unit 104 acquires desired spectrum by performing operation regarding to a plurality of wavelengths. In the present embodiment, the linear matrix unit 104 may execute, for example, outputting suitable for detecting a skin color. Moreover, in order to acquire biometric authentication information of veins and the like, the linear matrix unit 104 may execute operation so as to obtain an output suitable for detection of a wavelength region from yellow to red.

The frame memory 105 may be provided, for example, as a part of the storage unit 11 as described above. The frame memory 105 temporarily stores the information acquired from the pixel memory 8b output from the photoelectric conversion unit 8a at the same timing after the processing described above is performed. For example, the information processing unit 10 performs various processing described above on the fingerprint information acquired a the same timing in the frame memory 105, and finally stores the fingerprint information as one piece of image data color-reproduced by the linear matrix unit 104.

The authentication unit 106 executes personal authentication using the fingerprint information stored in the frame memory 105. For example, the personal authentication is executed by extracting a feature point in the fingerprint data and comparing the extracted feature point with the authentication information stored in the storage unit 11. Furthermore, the authentication unit 106 may execute biometric authentication for spoofing prevention on the basis of not only RGB information but also, for example, near-infrared light reception information, and information acquired via the plasmon filter. For example, the biometric authentication is executed according to whether or not the information of the wavelength corresponding to hemoglobin in the data stored in the frame memory 105 is normally acquired. The feature point and the like may be determined by statistical processing, or as another example, authentication may be performed using a neural network model trained by machine learning.

For example, the authentication unit 106 stores the fingerprint information of a specific user acquired in advance in the storage unit 11. The personal authentication is executed on the basis of the stored user information. In a case where a plurality of users is authenticated, fingerprint information of the plurality of users is appropriately stored. Furthermore, in the stored fingerprint information, an image of each fingerprint information or information of a feature point acquired from each fingerprint information may be encrypted.

The output unit 107 outputs a result of the authentication by the authentication unit 106. For example, in the case of shopping by e-commerce or the like, transmission to a server or the like may be performed such that payment processing is performed on the basis of the authentication result. In this manner, the output unit 107 may transmit the authentication result by using wireless communication. Furthermore, as another example, in the electronic equipment 1, an authentication result such as fingerprint authentication may be used instead of authentication using a password or the like.

Figure 4A:
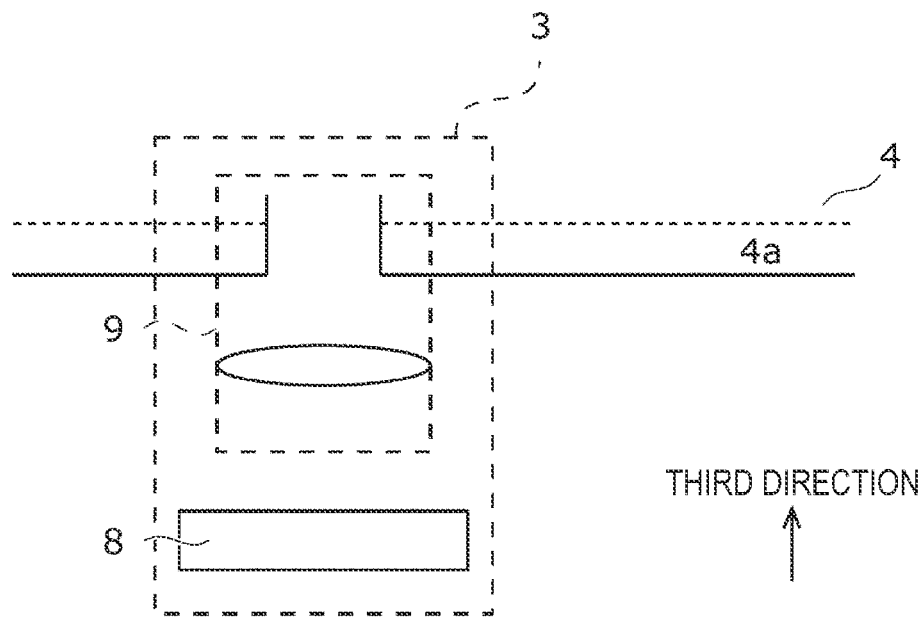
FIG. 4A is a diagram schematically illustrating a cross-sectional diagram of electronic equipment according to an embodiment.

FIG. 4A is a diagram describing a relationship between the camera module 3 and the display panel 4 in FIG. 1 in more detail. The camera module 3 includes, as described above, for example, the imaging unit 8 and the optical system 9. The optical system 9 is disposed on the light incident surface side of the imaging unit 8, that is, on the side close to the display unit 2. The light transmitted through the display surface of the display unit 2 is propagated to the imaging unit 8 by the optical system 9.

The imaging unit 8 may include, for example, the photoelectric conversion unit 8a such as a photodiode and the pixel memory 8b illustrated in FIG. 3. The light condensed, refracted, diffused, or the like, and propagated by the optical system 9 is received by the photoelectric conversion unit 8a included in the imaging unit 8 and output as an analog signal. The photoelectric conversion unit 8a may include, for example, a color filter such as of a Bayer array or the like on the incident surface side of each imaging element, or may include a stacked color filter. Furthermore, it may include another filter instead of the color filter as described above, or another element such as an organic photoelectric conversion film. Furthermore, regarding the output, although not illustrated, an element, a circuit, and the like necessary for receiving light and outputting an analog signal are provided.

For example, the optical system 9 may have a concept including a through-hole in a member having a low transmittance. The through-hole includes, for example, an aperture provided in the display panel 4, particularly, a substrate a having low transmittance in the display panel 4. For example, the optical system 9 includes the aperture provided in the display panel 4 and the lens disposed at a position closer to the imaging unit 8 with respect to the aperture. The optical system 9 may define optical features such as numerical aperture Na and f-number of camera module 3 according to the lens and the aperture.

Figure 4B:
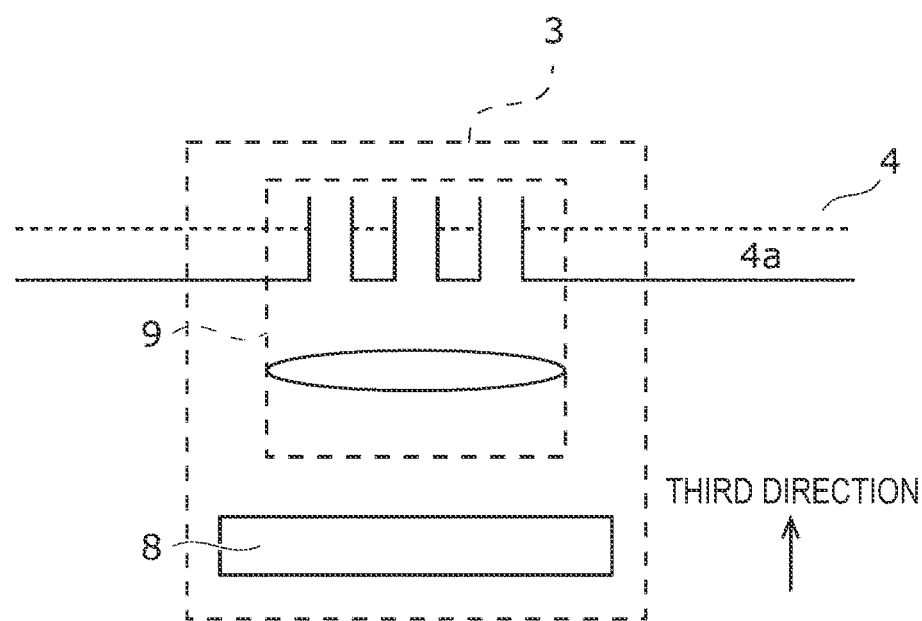
FIG. 4B is a diagram schematically illustrating a cross-sectional diagram of electronic equipment according to an embodiment.

Note that the aperture and the lens are illustrated as an example, and the configuration of the optical system 9 is not necessarily limited to such combination. Furthermore, in the drawing, one or a plurality of lenses is provided for one aperture, but it is not limited thereto. For example, as illustrated in FIG. 4B, a plurality of apertures may be provided for one lens in the optical system 9. In the region where the aperture does not exist, for example, light-emitting elements of the display panel 4 may be provided, and the aperture may be provided between the light-emitting elements. With this disposition, the camera module 3 can be provided without skewing the display.

FIG. 5A is a cross-sectional diagram schematically illustrating a light-receiving pixel according to an embodiment. The light-receiving pixel includes, for example, the photoelectric conversion unit 8a and the pixel memory 8b described above. Note that the present disclosure is presented as an example, and thus a detailed description thereof will be omitted. Furthermore, the light-receiving pixel of the present disclosure is not limited to the light-receiving pixel having the configuration illustrated in FIG. 5, and it is sufficient if it has a configuration that operates as the global shutter.

The photoelectric conversion unit 8a receives light in a light-receiving region 8R drawn above the photoelectric conversion unit 8a in the diagram with the optical system 9, the lens provided in the light-receiving pixel, and the like. This light-receiving portion is separated from a light-receiving region 8R of an adjacent pixel by a shielding portion 8d. As illustrated in the diagram, the shielding portion 8d is provided so that light does not pass through the upper portion of the pixel memory 8b, that is, the surface where the photoelectric conversion unit 8a has the light-receiving region 8R.

The shielding portion 8d includes, for example, metal, and the shielding portion 8d, the photoelectric conversion unit 8a, and the pixel memory 8b are separated from each other by an insulating portion 8e. The insulating portion 8e is, for example, an oxide film.

When receiving light in the light-receiving region 8R, the photoelectric conversion unit 8a accumulates charges according to the intensity of the received light. The accumulated charges are transferred to the pixel memory 8b by applying a voltage to an electrode 8c at a predetermined timing. An analog signal is output from the pixel memory 8b to the A/D conversion unit 100 by another transistor or the like before transfer of charges received at the next timing. The transfer to the A/D conversion unit 100 may not be performed at the same timing.

The charge transfer from the photoelectric conversion unit 8a to the pixel memory 8b is executed at the same timing over the plurality of photoelectric conversion units 8a existing in the light-receiving pixel array. The same timing is not exactly the same moment, and there may be a deviation to such an extent that shutter distortion does not occur. As described above, the imaging unit 8 can output analog signals of the light received at the same timing by executing the operation of the global shutter on the light received by the plurality of photoelectric conversion units 8a. Then, the information processing unit 10 can acquire images of the light received at the same timing. That is, the imaging unit 8 can, as the optical fingerprint sensor, acquire the fingerprint information of the user at the same timing.

FIG. 5B is a plan view schematically illustrating connection between the photoelectric conversion unit 8a and the pixel memory 8b illustrated in FIG. 5A in a plurality of pixels. As illustrated in the diagram, as an example, the electrode 8c may be a gate electrode of a transfer transistor in FIG. 5A. In FIG. 5B, wiring and the like other than a control line between the photoelectric conversion unit 8a and the pixel memory 8b are omitted, but of course, wiring and the like from the pixel memory 8b to the information processing unit 10 are appropriately provided.

The connection between the photoelectric conversion unit 8a and the pixel memory 8b of each light-receiving pixel is controlled by a transfer transistor. After the charges of the pixel memory 8b are transferred and the charges provided in the pixel memory 8b are discharged, a voltage for transferring the charges from the photoelectric conversion unit 8a to the pixel memory 8b is applied to the electrode 8c of each light-receiving pixel at the same timing over the same time. For example, in a case where the transfer transistor is an n-type MOSFET, the voltage is a voltage sufficiently higher than a threshold voltage for causing the charges to flow from the drain to the source. By applying the voltage at the same timing, the charges acquired by photoelectric conversion at the same timing are transferred to the respective pixel memories 8b. As a result, analog information (charges) of images acquired at the same timing is temporarily stored in each pixel memory 8b.

The output from the pixel memory 8b may not be at the same timing, and is appropriately transferred to the information processing unit 10. For example, the transfer from the pixel memories 8b to the information processing unit 10 is executed at a predetermined timing for each line.

Note that, in the above description, the pixel memory 8b stores the charge state as an example, but it is not limited thereto. As another example, the pixel memories 8b may store another state regarding a voltage state, a digital value, or received intensity information.

Furthermore, in FIGS. 5A and 5B, the pixel memory 8b is provided on the same substrate as the light-receiving element, but it is not limited thereto. Furthermore, the pixel memory 8b may be provided, for example, in a chip stacked and connected with the imaging element. In this case, the transfer transistor may be provided in any layer or between layers. These layers may be connected by, for example, via holes, microbumps, micropads, plasma bonding, or the like. These connections may be stacked by, for example, a method of chip on chip (CoC), chip on wafer (CoW), or wafer on wafer (WoW).

To summarize FIGS. 1 to 5, the imaging unit 8 may include an imaging element including light-receiving elements in an array in the first direction and the second direction on the side opposite to the display surface of the display unit 2, which is a display, in a third direction. Then, each of these light-receiving elements implements the operation of the global shutter that reads the light reception information at the same timing. Reading the light reception information at the same timing may indicate that information of charges photoelectrically converted in the light-receiving element (photoelectric conversion unit) is transferred to the memory provided for each light-receiving element at the same timing. Note that the light-receiving pixel may adopt not those illustrated in FIGS. 5A and 5B, but other methods for implementing the operation equivalent to the global shutter.

As described above, the information processing unit 10 executes signal processing of the fingerprint information read by the imaging unit 8, i.e., the optical fingerprint sensor. Then, for example, the user slides a finger (performs a swipe motion) on the display surface of the display unit 2, so that the fingerprint information is acquired by the optical fingerprint sensor and personal authentication or the like can be executed. Hereinafter, the swipe motion will be described, but it is not limited to swipe, and any motion such as flick or wipe may be used as long it is a slide motion on the touch panel.

FIG. 6 is a flowchart of personal authentication processing according to an embodiment.

First, the electronic equipment 1 determines whether or not to start personal authentication (S100). When it is not the timing to start the personal authentication (S100: NO), the standby state is continued. For the start of authentication, for example, as indicated by the dotted line in FIG. 3, the sensing information of the touch panel 6 may be used. For example, after the sensing information on the touch panel 6 reaches the range of the camera module 3, the processing may shift to the fingerprint information acquisition processing. As a preceding stage, the electronic equipment 1 may be notified that the authentication processing is executed on a website or the like in order to perform authentication, and the electronic equipment 1 may be in the standby state.

In the authentication start state (S100: YES), the imaging unit 8 starts light reception for personal authentication (S102). For example, by activating the camera module 3 for fingerprint authentication, the processing shifts to the standby state for acquisition of fingerprint information, and performs light reception at a necessary timing.

In a case where the fingerprint authentication is executed, the photoelectric conversion unit 8a of the imaging unit 8 transfers the received light intensity to the pixel memory 8b at the same timing as described above (S102). This transfer is executed, for example, by applying a voltage for transfer to the plurality of electrodes 8c at the same timing.

Next, the A/D conversion unit 100 performs A/D conversion on the data transferred to the pixel memory 8b at the same timing (S106). Here, the analog signal acquired by the photoelectric conversion unit 8a and output from the pixel memory 8b is converted into a digital signal.

Next, the information processing unit 10 executes signal processing and image processing other than A/D conversion on the converted digital signal (S108). This processing is, for example, processing of clamping, color-by-color output, defect correction, color reproduction, and processing of storage in the frame memory 105 as described above. Note that the above is an example, and further appropriate processing may be executed in addition to the above.

Next, the authentication unit 106 executes authentication using an image including the acquired fingerprint information (S110). For example, as described above, the authentication may be executed by extracting feature points and performing comparison processing, or by using a trained neural network. Note that the electronic equipment 1 may include a chip capable of executing the information processing and the processing of the neural network described above in the same substrate as the camera module 3.

The output unit 107 outputs the authentication result to a necessary place (S112). For example, in the personal authentication in the case of shopping on a web, a browser that opens the website or an application that receives the authentication result may be notified of the personal authentication result. In this manner, the output unit 107 can execute output to a necessary place.

For example, in a case where the authentication cannot be performed, the output unit 107 may give a notification that the authentication has failed so as to perform the authentication operation again. Furthermore, the output unit 107 may issue an imaging instruction to the imaging unit 8 again.

In a case where images are acquired in consecutive frames, the authentication unit 106 may execute the authentication processing using a plurality of pieces of fingerprint information. For example, when authentication can be performed using one of the plurality of pieces of fingerprint information, the output unit 107 may be notified that the authentication has succeeded at that timing.

In a case where authentication with high accuracy is required, the authentication unit 106 may change an authentication success/failure threshold value on the basis of the authentication accuracy. For example, in a case where high authentication accuracy is required, the authentication accuracy can be enhanced by increasing an authentication threshold value, for example, a fingerprint matching degree threshold value. In order to enhance the authentication accuracy, for example, a feature point matching degree threshold value may be increased. Furthermore, in a case where a neural network model is used, a matching degree threshold value may be increased. The case where authentication with high accuracy is required is, for example, when an expensive product is to be purchased, when information with high confidentiality is to be accessed, and the like.

Furthermore, in a case where the imaging unit 8 includes a near-infrared filter, a plasmon filter, or the like, authentication as to whether or not it is a biological body may be performed together with personal authentication. In this authentication, for example, whether it is the wavelength of light transmitted through hemoglobin such as of veins is authenticated on the basis of the information acquired by near infrared rays or the like. In a case where this authentication is executed, determination may be made such that light such as infrared light is emitted from the display unit 2 and this reflection state is acquired.

It is not limited to the above, and, for example, the display panel 4 may emit light of various colors and authentication that it is a biological body may be performed on the basis of reflection of the emitted light. In this case, a filter for acquiring various colors may be provided as described above, and so-called multispectral or hyperspectral information may be acquired and analyzed. For example, it is possible to make a determination on the basis of information indicating reflection from the skin specific to a biological body, particularly a human, or the inside of the skin.

For the authentication of a biological body, not only the acquisition by the imaging unit 8 but also, for example, the sensing information of the touch panel 6 may be used. For example, the authentication unit 106 may determine whether or not the sensed region has elasticity on the touch panel 6 and authenticate that it is a biological body. For this, the imaging unit 8 may be used, and it may be determined whether the image of the finger acquired by the imaging unit 8 has elasticity in terms of time. The elasticity may be determined on the basis of, for example, a change in the shape or a change in the size of the region occupied by the finger. Furthermore, the touch panel 6 may include a pressure-sensitive sensor, and the elasticity may be determined on the basis of the sensing information of the pressure sensitive sensor.

Furthermore, the authentication accuracy may be enhanced by acquiring the fingerprint information at a plurality of timings. For example, the imaging unit 8 may acquire the fingerprint information at a plurality of timings, and the fingerprint information may be accumulated in the frame memory 105. Then, the authentication may be executed using the accumulated fingerprint information. For example, a defect or the like in an image generated at the time of image acquisition may be corrected by referring to the pieces of fingerprint information. More simply, after adjusting the position and angle of the fingerprint, a weighted average of fingerprint information acquired for each time may be obtained. Then, the fingerprint information acquired by the average operation may be set as an authentication target.

The imaging unit 8 may include a filter other than the above. For example, by providing a polarizing filter in the light-receiving pixel, polarized fingerprint information can be acquired. By acquiring the polarized information, the unevenness of the fingerprint can be more clearly acquired. The information processing unit 10 may combine such polarized information to extract a feature point.

Furthermore, even when the imaging unit 8 operates as a global filter, motion blur or the like can occur depending on the shutter speed. In order to cope with this motion blur, the information processing unit 10 may include an image correction unit that performs degradation correction on the image included in the frame memory 105.

As described above, according to the present embodiment, it is possible to implement highly accurate personal authentication by using the camera module under the display. Moreover, spoofing can be prevented by authenticating that it is a human body. Furthermore, in the imaging unit 8, since it is possible to acquire an image by the operation of the global shutter, it is possible to implement fingerprint authentication that is robust against distortion or the like depending on the shutter of the image.

Second Embodiment

In the first embodiment described above, the swipe velocity of the user is not considered. In the second embodiment, the velocity of the user's finger is determined, and fingerprint information correction based on the speed is executed.

Figure 7:
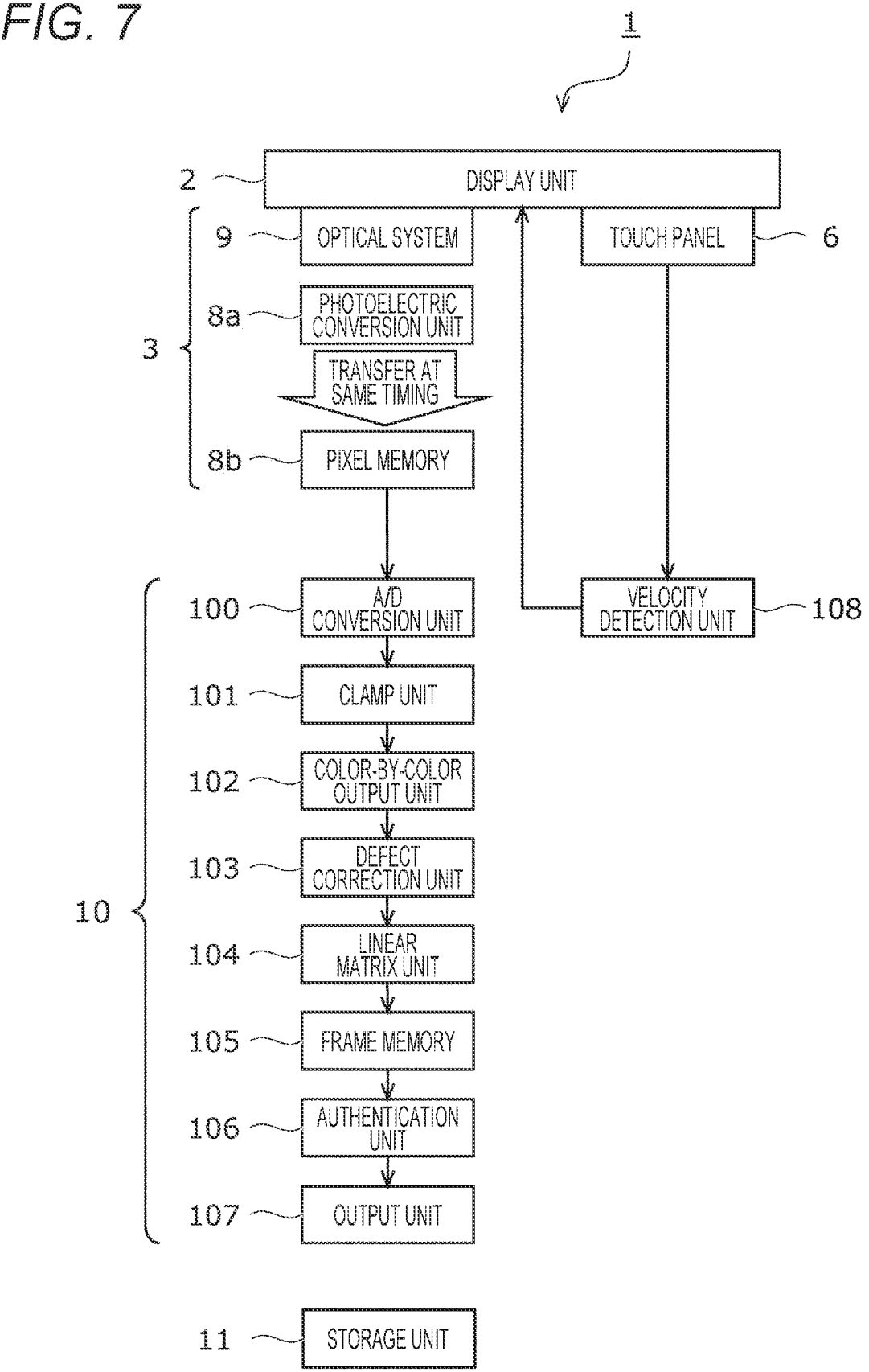
FIG. 7 is a block diagram illustrating an example of a configuration of electronic equipment according to an embodiment.

FIG. 7 is a diagram illustrating an example of a block diagram of the electronic equipment 1 according to the present embodiment. The electronic equipment 1 further includes a velocity detection unit 108 in addition to the constituent elements described with reference to FIG. 3.

For example, the velocity detection unit 108 acquires the speed of the movement of the user's finger at the timing when the camera module 3 acquires the image of the fingerprint on the basis of the sensing information of the touch panel 6. That is, in a case where the user performs a swipe motion, the camera module 3 acquires the fingerprint information from the light reception information, and the touch panel 6 acquires the finger speed information from the sensing information. For example, the velocity detection unit 108 acquires the speed of the finger on the basis of the movement amount of the user's finger region sensed by touch panel 6 within a predetermined time.

The velocity detection unit 108 acquires the information for velocity sensing from the touch panel 6, for example, in a case where the user's finger touches the touch screen at the timing of performing authentication. For example, in a case where the user's finger moves, the velocity detection unit 108 acquires the sensing information of the touch panel 6 at a certain time and the sensing information of the touch panel 6 after a predetermined time.

For example, in a case where the finger region is sensed, the sensing information of the touch panel 6 may be acquired from the center point of the finger region, for example, the position of the centroid. The position of the centroid can be acquired, for example, by calculating an addition average of the points in the sensed region in the first direction and the second direction. Then, the velocity detection unit 108 detects the swipe velocity of the user's finger by obtaining the position of the centroid at a certain time and after a predetermined time.

Figure 8:
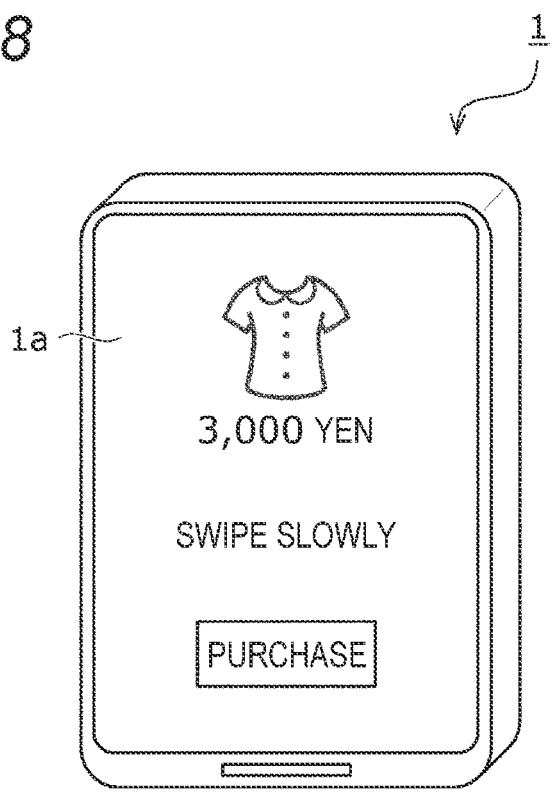
FIG. 8 is a diagram schematically illustrating electronic equipment according to an embodiment.

In a case where the speed of the finger is faster than a predetermined velocity, for example, as illustrated in FIG. 8, the velocity detection unit 108 may perform outputting to urge the user to slow down the velocity of the swipe to the display unit 2. Furthermore, as another example, the velocity detection unit 108 may notify the output unit 107 that the velocity is too fast and perform outputting to the display unit 2 via the output unit 107. Note that, in this case, the output unit 107 is not limited to display on the display unit 2, but may, for example, notify the user by a sound from a speaker or vibrate a vibrator.

Furthermore, the output unit 107 may determine the speed on the basis of desired authentication accuracy. In such a case, for example, in a case where high authentication accuracy is required, the output unit 107 can output, to the user, that the threshold value for the velocity detected by the velocity detection unit 108 is lowered and the swipe is performed slowly in a slower speed state.

Figure 9:
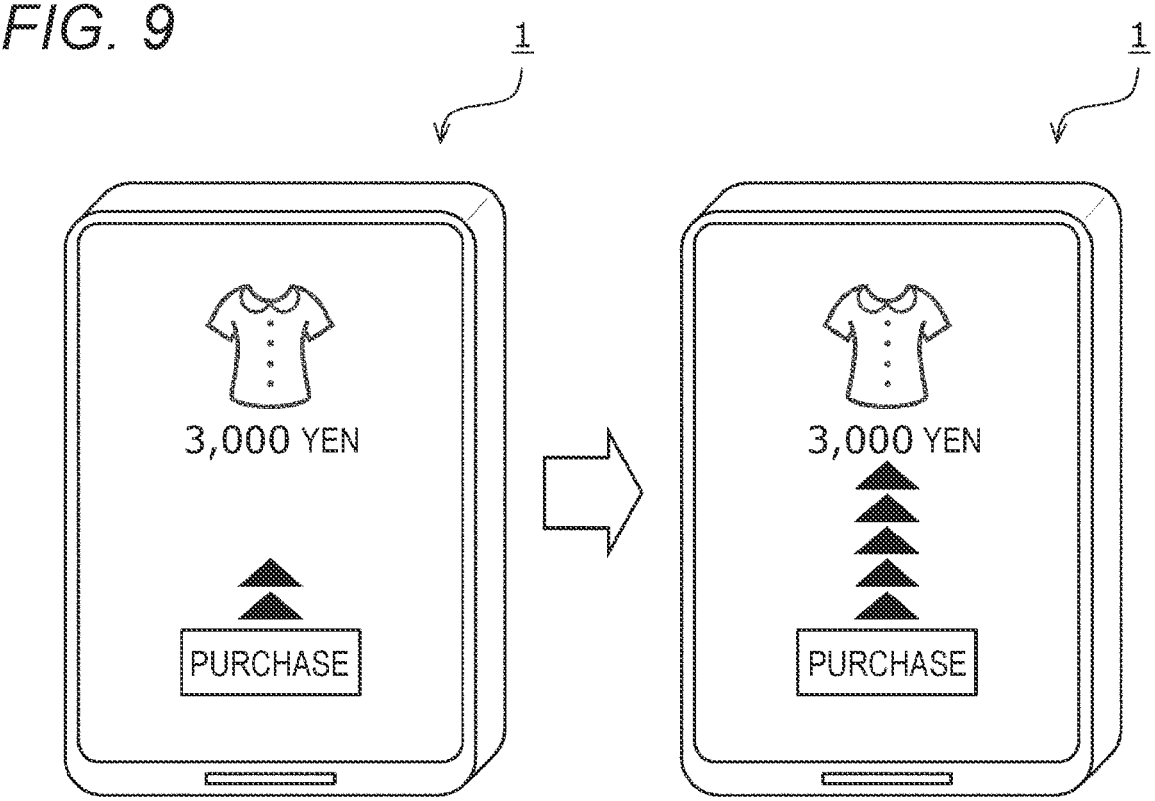
FIG. 9 is a diagram schematically illustrating electronic equipment according to an embodiment.

FIG. 9 illustrates another example of the output. For example, the output unit 107 may perform display in which the number of triangle marks displayed within a predetermined time gradually increases from the left diagram to the right diagram. The increasing speed of the triangle marks may be a speed at which the imaging unit 8 acquires fingerprint information with high accuracy. In this manner, the output unit 107 may output an index (speed guide) indicating the speed on the display. This index is not limited to a triangle as illustrated in FIG. 9, and may be, for example, a diagram in which an arrow extends, and is not limited thereto, and may be any figure, shape, or the like as long as it is an interface that indicates the speed to the user.

Furthermore, although the velocity detection unit 108 detects the speed on the basis of the sensing information of the touch panel 6, it is not limited thereto. For example, the speed may be detected on the basis of the imaging information acquired by the imaging unit 8. For example, the velocity detection unit 108 may refer to the frame memory 105 and detect the speed of the user's finger on the basis of the timing from the timing at which the image of the user's finger is acquired to the timing at which the image of the user's finger cannot be acquired and on the basis of the time taken between the timings and the size of the fingerprint acquisition region. It is not limited thereto, and the speed may be detected by estimating how much the finger moves after one frame or a plurality of frames from a certain time.

As described above, according to the present embodiment, by detecting the swipe velocity of the user's finger, it is possible to enhance the accuracy of fingerprint acquisition or enhance the accuracy of authentication of the acquired fingerprint. Furthermore, if necessary, it is also possible to perform outputting to urge the user to obtain a speed suitable for the fingerprint acquisition.

Note that the velocity detected by the velocity detection unit 108 can also be used for other purposes. For example, the camera module 3 may acquire the fingerprint information at an appropriate exposure time on the basis of the velocity information. For example, the camera module 3 may shorten the exposure time in a case where the velocity is slow and may lengthen the exposure time as the velocity is faster.

Third Embodiment

Processing of performing correction based on the velocity may be further added to the configuration of the second embodiment.

Figure 10:
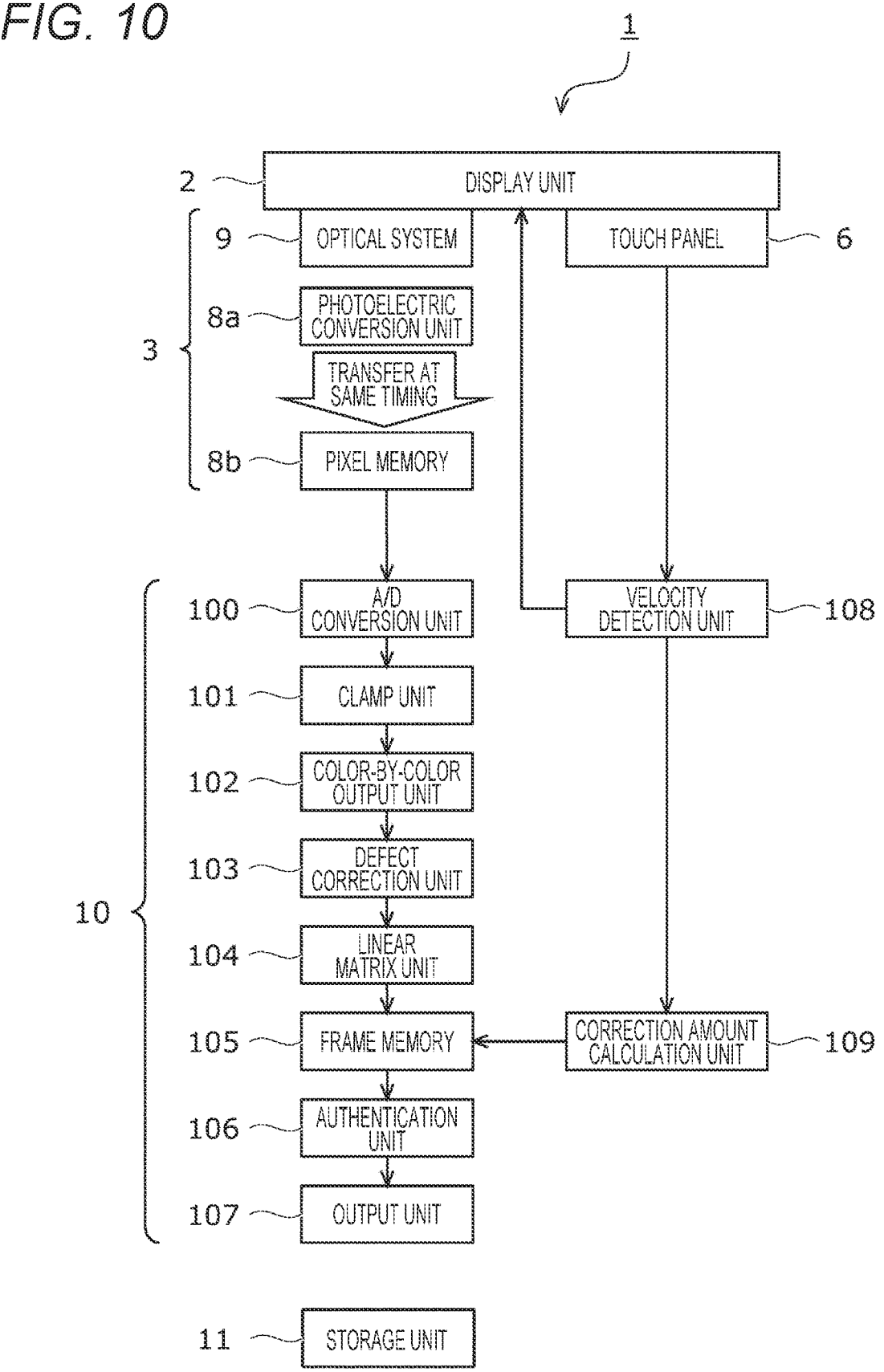
FIG. 10 is a block diagram illustrating an example of a configuration of electronic equipment according to an embodiment.

FIG. 10 is a diagram illustrating an example of a block diagram of the electronic equipment 1 according to the present embodiment. The electronic equipment 1 further includes a correction amount calculation unit 109 in addition to the constituent elements described with reference to FIG. 7.

The correction amount calculation unit 109 acquires a correction amount based on the velocity detected by the velocity detection unit 108. The image processing may be performed on the fingerprint information stored in the frame memory 105 on the basis of the correction amount. This image processing is, for example, image processing based on motion blur. A point spread function (PSF) may be generated on the basis of the finger velocity and the shutter speed, and inverse filter processing (deconvolution filter processing) may be executed on the fingerprint information.

By executing such processing, the authentication accuracy can be further improved.

Fourth Embodiment

In the above description, authentication is implemented using one finger as a representative example. For example, authentication of an index finger may be used. Moreover, authentication using a plurality of fingers may be performed.

For example, the imaging unit 8 may acquire not only the information of the index finger but also the information of the middle finger at the same swipe timing, and execute the personal authentication based on the two fingers. Moreover, three to five fingers may be used, or authentication may be performed using distant fingers such as an index finger and a ring finger. Of course, the index finger may not be included in the combination of the plurality of fingers.

Although the same timing is mentioned in the above description, different timings may be possible, for example, such that the first authentication is executed with the index finger and then the second authentication is executed with the middle finger. In this case, information of both hands: the right hand and the left hand may be used.

In a case where the information is acquired using a plurality of fingers at the same timing, the information obtained by swiping the plurality of fingers may be acquired as one piece of authentication information instead of executing authentication for each finger.

As described above, authentication using any number or combination of fingers may be executed at any timing. By increasing the authentication information in this manner, it is possible to more accurately prevent erroneous detection and spoofing. The authentication using a plurality of fingers may be changed on the basis of the required level of authentication accuracy. For example, in a case where high authentication accuracy is required, a plurality of fingers may be used, or a specific combination of fingers may be used.

Fifth Embodiment

The electronic equipment 1 of each of the above-described embodiments is, for example, a device such as a smartphone. In such a device including a touch panel, a finger can pass over the camera module 3 at a timing other than the timing of the fingerprint authentication.

Thus, the electronic equipment 1 according to the present embodiment acquires information of such a finger at any timing with the imaging unit 8. Then, in a case where the authentication unit 106 can authenticate that it is a registered user, the imaged fingerprint information may be stored in the storage unit 11. However, also in a case where the authentication is performed, in a case where the authentication is successful, the acquired fingerprint information may be stored in the storage unit 11.

Then, the information processing unit 10 may update the information used for authentication on the basis of the information accumulated at any timing. For example, in a case where the fingerprint information is acquired as image information, information accumulated in the same direction and the same position may be calibrated, and a weighted average may be calculated such that weighting becomes heavier as information is new, and it may be used as information used for authentication.

Furthermore, in a case where personal authentication is performed using a predetermined finger, at a timing when the user uses another finger, this finger may be acquired as information of another finger of the user, and the information may be stored in the storage unit 11. By coping in this way, the authentication accuracy can be enhanced even in the case of the plurality of fingers described above.

As described above, according to the present embodiment, the information used for authentication can be updated. By updating, it is possible to acquire information used for authentication, which is also applicable to a subtle change in a finger (fingerprint) due to aging, a change due to environment, and the like. As a result, the accuracy of the personal authentication can be maintained high.

Sixth Embodiment

Figure 11:
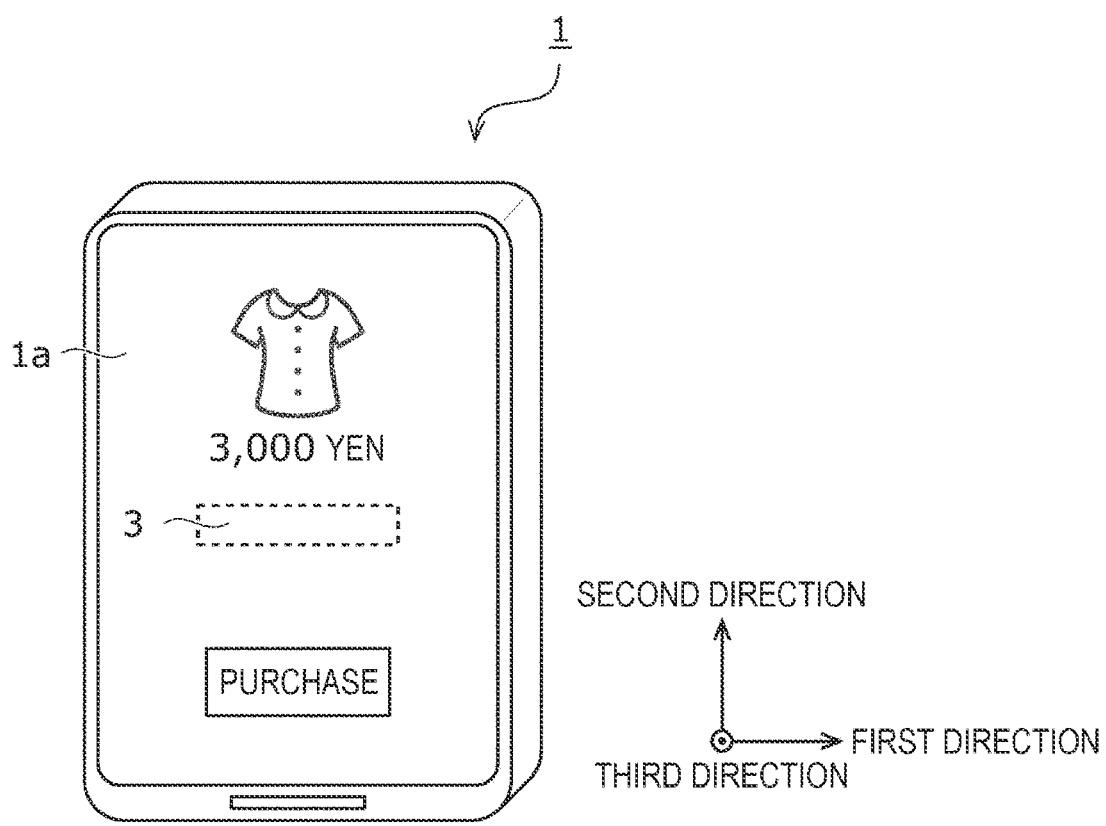
FIG. 11 is a diagram schematically illustrating electronic equipment according to an embodiment.
Figure 12:
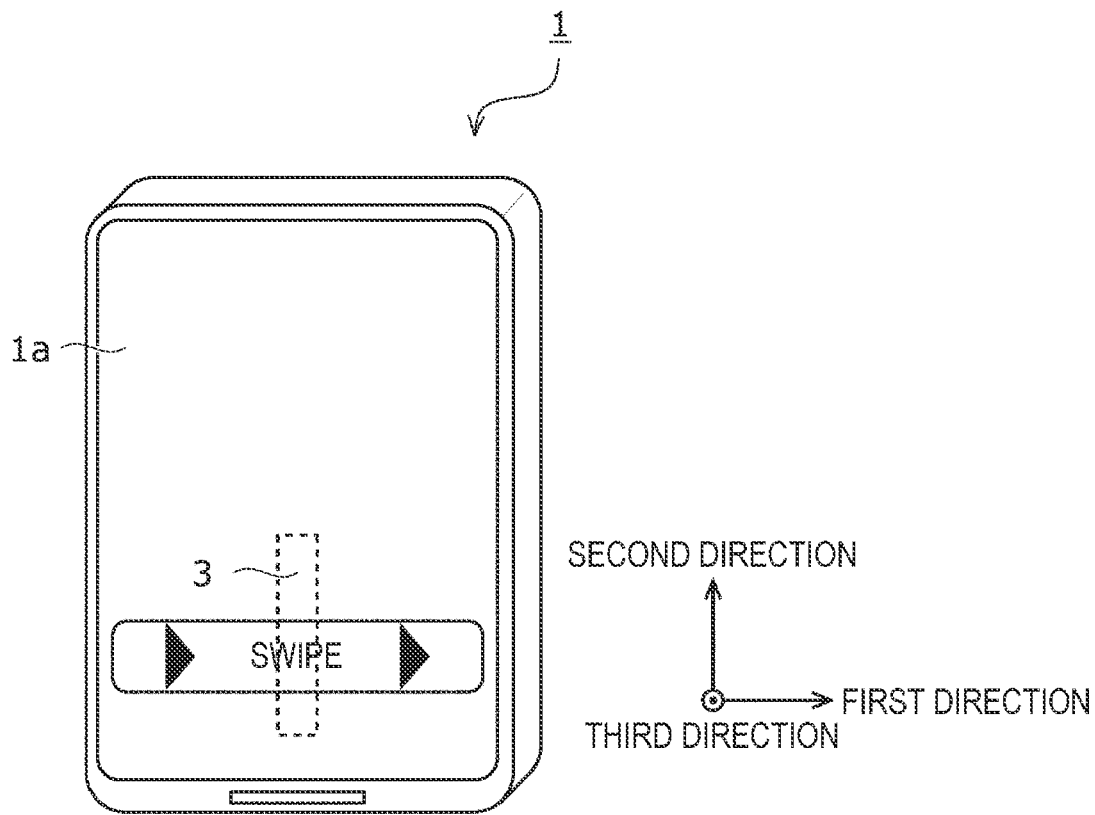
FIG. 12 is a diagram schematically illustrating electronic equipment according to an embodiment.

FIGS. 11 and 12 are diagrams schematically illustrating the electronic equipment 1 according to the present embodiment. In the present embodiment, the camera module 3 is disposed so that the perpendicular direction is long with respect to a swipe direction. For example, as illustrated in FIG. 11, in a case where swiping is performed from the top to the bottom or from the bottom to the top (second direction), the camera module 3 having a region where the imaging unit 8 is wide in the lateral direction (first direction) is used. As illustrated in FIG. 12, in a case where swiping is performed from the left to the right or from the right to the left (first direction), the camera module 3 having a region where the imaging unit 8 is wide in the vertical direction (second direction) is used.

For example, the imaging unit 8 can be mounted as described above by including the photoelectric conversion unit 8a (light-receiving pixel) in a range indicated by the dotted lines in FIGS. 11 and 12. Regarding the size of the light-receiving pixel, the number of light-receiving pixels disposed in a wider range may be twice or more the number of light-receiving pixels disposed in a narrower range. For example, in FIG. 11, the number of light-receiving pixels provided along the first direction may be twice or more the number of light-receiving pixels provided along the second direction.

Then, moreover, a guide indicating the direction of swipe may be displayed as illustrated in FIG. 12 so that the light-receiving pixel crosses a certain range. As another example, a range in which the fingerprint authentication can be performed by the swipe motion, that is, the range indicated by the dotted lines in FIGS. 11 and 12 may be displayed on the display. By displaying in this manner, it is also possible to indicate to the user which part to swipe to be able to execute the personal authentication.

Seventh Embodiment

An object displayed on the display unit 2 of the electronic equipment 1 may make the swipe region easy for the user to understand. This object may change dynamically.

Figure 13:
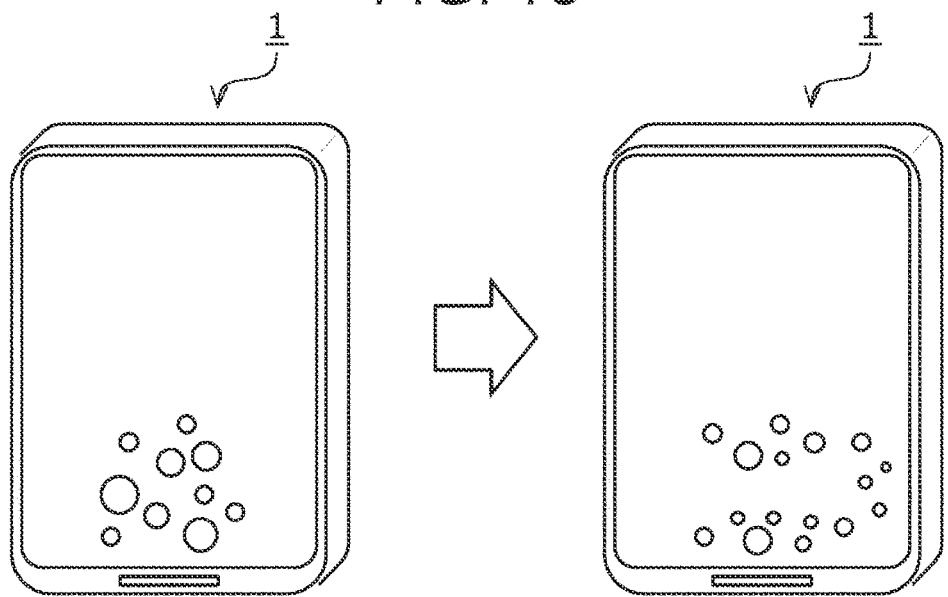
FIG. 13 is a diagram illustrating an example of a user interface of electronic equipment according to an embodiment.

FIG. 13 is a diagram illustrating an example of a graphical user interface (GUI) displayed on the display unit 2 of the electronic equipment 1. For example, an object having a circular shape such as water droplets is displayed on the display unit 2 as illustrated in the left diagram. Then, the object may be operated to come apart as illustrated in the right diagram when the user swipes so as to cross the object having a circular shape.

Furthermore, in the state of waiting for a swipe, the object in the left diagram may, for example, be shaking or moving in a predetermined region so as to more clearly indicate the swipe region. The shape and size may be changed by touching with the user's finger. Furthermore, it may fade out to disappear after the swipe.

The display of the object is not limited to polka dots as in FIG. 13, and for example, an object having a stream like a river may be displayed. Such display may indicate the direction of the swipe or the like to the user. It is not limited to these examples, and it is sufficient if, for example, a predetermined character is displayed, something like a target is displayed, or something that is easy for the user to understand is displayed.

The light-emitting state of the light-emitting element may be changed when the user's finger touches the object region. By changing the light-emitting state, the wavelength of the reflected light on the display panel 4 touched by the user's finger may be changed, and the fingerprint information may be easily acquired by the change in the wavelength. For example, a situation in which the color of the skin of the user or reflection from a vein is easily understood may be provided by setting the wavelength of the light to be emitted to a yellow to red wavelength, or conversely, by emitting light such as of cyan having a wavelength close to a complementary color, the wavelength of the reflected light can be made suitable for acquiring the fingerprint information.

Then, the object may dynamically change on the basis of the fingerprint information acquisition status. For example, in a case where the fingerprint information is normally acquired, the color of the object may change, the shape may change, or the object may fade out and disappear. In a case where the fingerprint information is not normally acquired, the object in an initial state may be displayed, or the color and shape may be changed to be different from those in a case where the fingerprint information is normally acquired. Furthermore, as in the above-described embodiments, a speed guide and a location guide may be displayed. The information processing unit 10 may include a fingerprint information acquisition determination unit that determines acquisition of fingerprint information. The acquisition of the fingerprint information may be based on, for example, whether or not a predetermined number or more of unevennesses have been sensed in a predetermined region.

This may be based on the authentication information. For example, the object may be changed as described above between a case where the personal authentication succeeds and a case where the personal authentication fails. Of course, a two-stage change may be performed on the basis of the fingerprint information acquisition status and the authentication success/failure status.

As described above, according to the present embodiment, it is also possible to widen the region of the camera module 3 where the imaging unit 8 is present in the direction intersecting the swipe direction. By providing the optical fingerprint sensor in this manner, it is possible to mount the optical fingerprint sensor having robustness against positional deviation.

Eighth Embodiment

Figure 14:
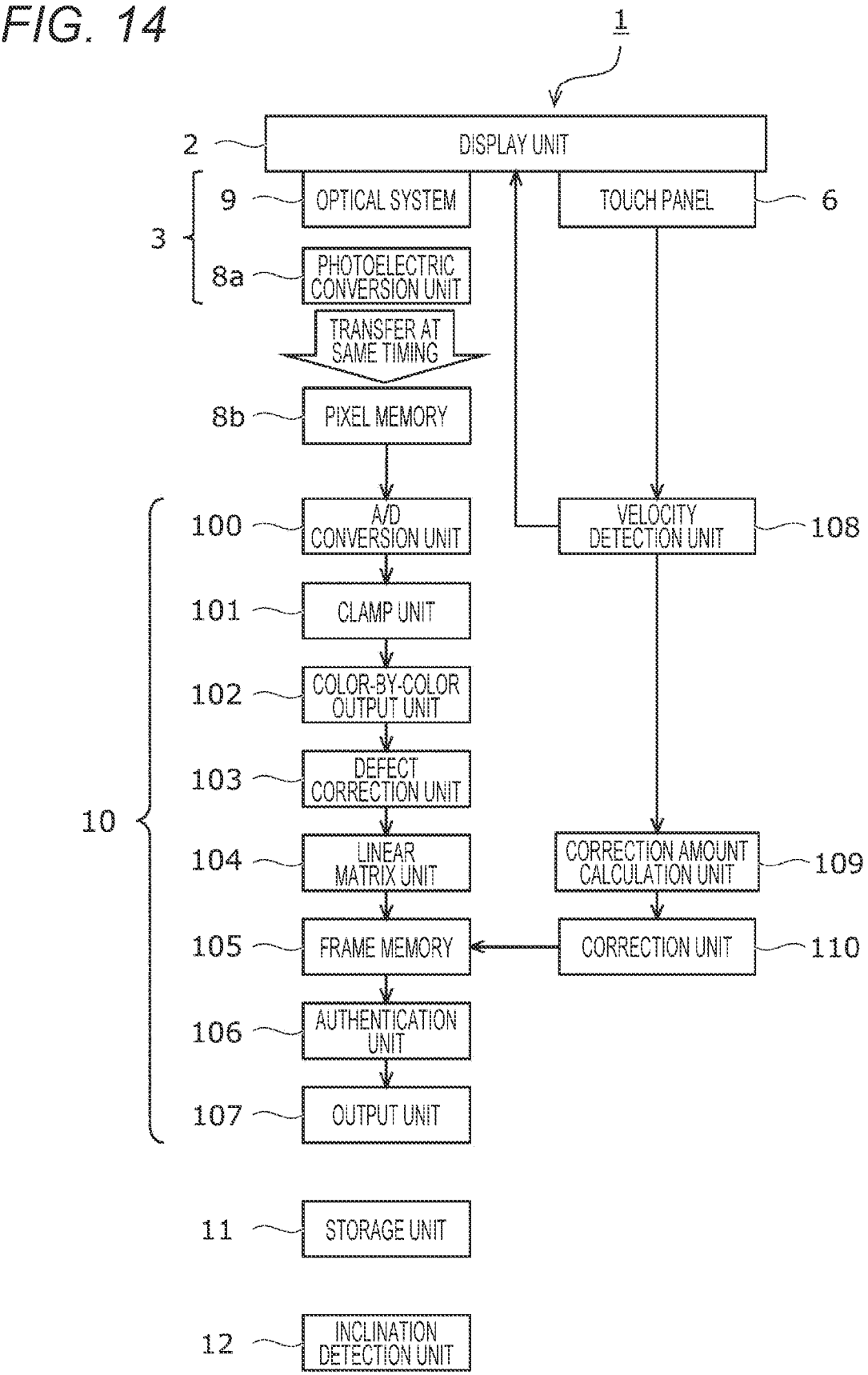
FIG. 14 is a block diagram illustrating an example of a configuration of electronic equipment according to an embodiment.

FIG. 14 is a block diagram illustrating an example of the electronic equipment 1 according to the present embodiment. The electronic equipment 1 further includes an inclination detection unit 12.

The inclination detection unit 12 includes, for example, a gyroscope or an acceleration sensor. The inclination detection unit 12 detects the inclination of the electronic equipment 1 at the timing when the fingerprint information is acquired. The inclination is, for example, an inclination of the display with respect to a gravity (vertical direction) or horizontal direction.

Figure 15:
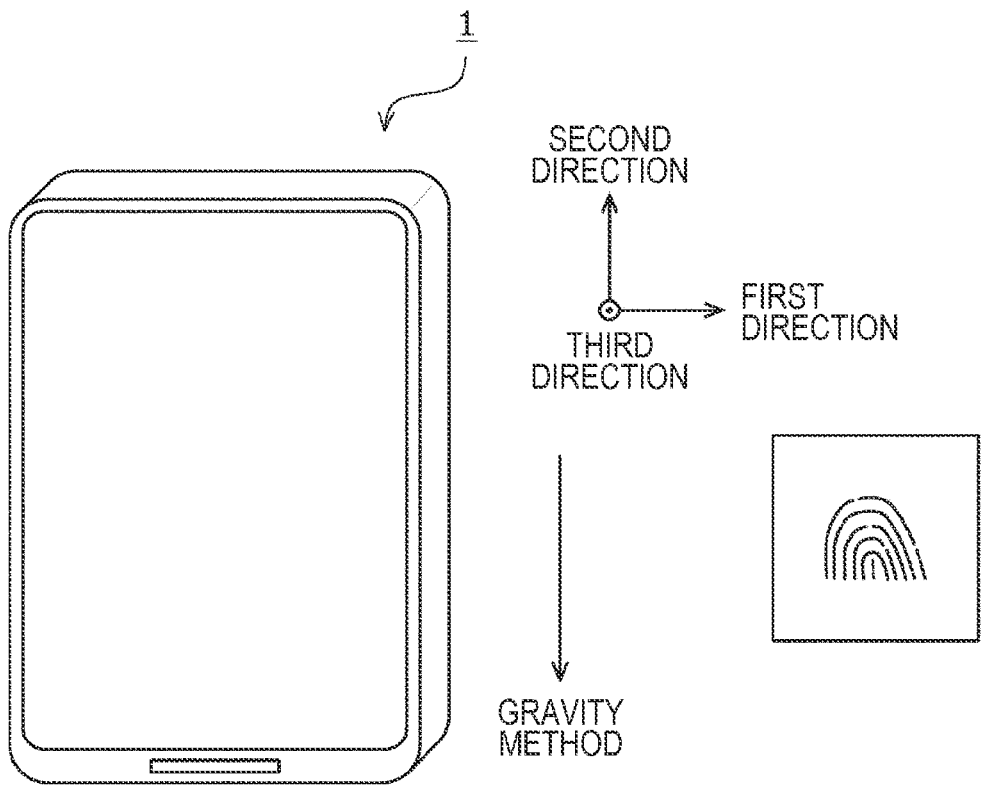
FIG. 15 is a diagram schematically illustrating electronic equipment according to an embodiment.
Figure 16:
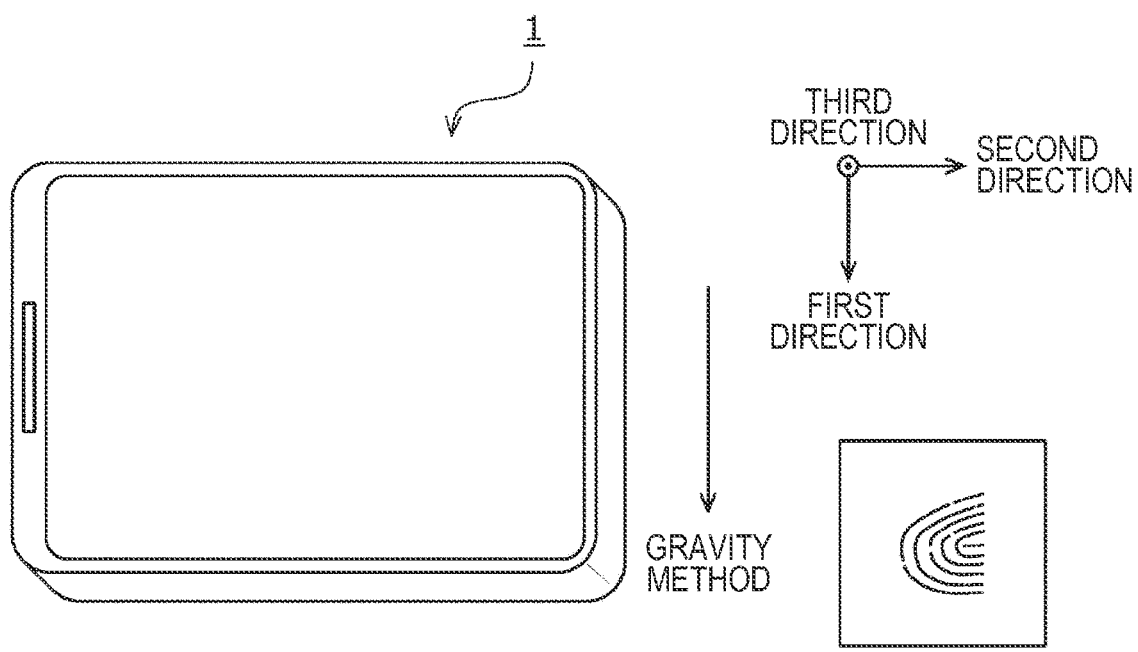
FIG. 16 is a diagram schematically illustrating electronic equipment according to an embodiment.

FIGS. 15 and 16 are diagrams illustrating an example of the inclination of the electronic equipment 1. For example, as illustrated in FIG. 15, the first direction and the second direction in the electronic equipment 1 are represented as the sum of components in the gravity direction and the horizontal direction intersecting the gravity direction. In a case where the absolute value of the gravity direction component in the first direction is smaller than the absolute value of the gravity direction component in the second direction, the authentication unit 106 executes the fingerprint authentication by preferentially using the matching data in which the finger is pointing upward in the diagram illustrated in the right diagram.

On the other hand, as illustrated in FIG. 16, in a case where the absolute value of the gravity direction component in the first direction is larger than the absolute value of the gravity direction component in the second direction in the electronic equipment 1, the authentication unit 106 executes the fingerprint authentication by preferentially using the matching data in which the finger is pointing leftward in the diagram illustrated in the right diagram.

Furthermore, the magnitude and sign of the gravity direction in each direction may be used in this case, for example, the fingerprint authentication can be executed by preferentially using matching data in which the fingerprint is rotated 90 degrees depending on which of the four sides is located below.

As described above, according to the present embodiment, by selecting or preferentially selecting matching data according to the inclination with respect to gravity, it is possible to enhance the accuracy of matching or increase the velocity of matching. As an example, the case of every 180 degrees or every 90 degrees has been described, but the span of the angle may be smaller.

Furthermore, although the matching pattern is selected, it is not limited thereto. For example, the personal authentication processing may be executed by rotating the corrected fingerprint information on the basis of the result of the inclination detection.

Note that the present technology can adopt the configuration described below.

(1)

Electronic equipment including:
a display; and
an optical fingerprint sensor, in which
the display includes a display surface including light-emitting pixels in an array in a first direction and a second direction intersecting the first direction, and
the optical fingerprint sensor includes an imaging element including light-receiving elements in an array in the first direction and the second direction on a side opposite to the display surface of the display in a third direction intersecting the first direction and the second direction, and each of the light-receiving elements transfers a photoelectrically converted charge at the same timing.

(2)

The electronic equipment according to (1), in which the imaging element includes pixel memory that temporarily stores light reception information of each of the light-receiving elements, and transfer of information from the light-receiving element to the pixel memory is executed at the same timing.

(3)

The electronic equipment according to (2), in which transfer of information from the light-receiving element to the pixel memory is executed by applying a transfer control signal to a transfer transistor that transfers charges stored in the light-receiving element to the pixel memory at the same timing.

(4)

The electronic equipment according to (1) to (3), further including:
an information processing unit that executes information processing of fingerprint information read by the imaging element.

(5)

The electronic equipment according to (4), in which the information processing unit reads the fingerprint information during an operation including at least a swipe motion of a finger.

(6)

The electronic equipment according to (5), further including:
a touch panel that senses contact information with respect to the display, in which
a velocity of the swipe motion is estimated on the touch panel.

(7)

The electronic equipment according to (5) or (6), in which the information processing unit estimates a velocity of the swipe motion on the basis of information read by the imaging element.

(8)

The electronic equipment according to any of (5) to (7), in which
an instruction to slow down the speed of the swipe motion is output on the basis of required authentication accuracy.

(9)

The electronic equipment according to (8), in which the instruction of the speed of the swipe motion is output to the display.

(10)

The electronic equipment according to (8) or (9), in which the instruction displays a speed guide on the display.

(11)

The electronic equipment according to any of (8) to (10), in which
in a case where the speed is faster than a predetermined speed, the fact that the speed is too fast is output.

(12)

The electronic equipment according to (11), in which an output indicating that the speed is too fast is at least one of an output to the display, an output with a sound, or an output with vibration.

(13)

The electronic equipment according to (6), in which the information processing unit shortens an exposure time of the optical fingerprint sensor in a case where the speed is faster than a predetermined speed.

(14)

The electronic equipment according to any of (5) to (13), in which
the information processing unit generates authentication information from the fingerprint information captured at different times.

(15)

The electronic equipment according to (14), in which the light-emitting pixel outputs light of different wavelengths on a display surface side of the light-receiving element, and
the light-receiving element acquires the fingerprint information on the basis of reflected light of different wavelengths.

(16)

The electronic equipment according to (14) or (15), further including:
a polarizing filter between the light-receiving element and the display surface, in which
the light-receiving element senses polarized light via the polarizing filter.

(17)

The electronic equipment according to any of (14) to (16), further including:
a filter that acquires a state of hemoglobin between the light-receiving element and the display surface, in which
the information processing unit acquires information of the hemoglobin and performs biometric authentication.

(18)

The electronic equipment according to any of (14) to (17), in which
the information processing unit performs biometric authentication on the basis of information of a temporal shape change of a finger in contact with the display surface.

(19)

The electronic equipment according to any of (5) to (18), in which
the light-receiving element detects the swipe motion of a plurality of fingers.

(20)

The electronic equipment according to (19), in which the information processing unit executes the fingerprint authentication using a combination of the plurality of fingers in the swipe motion of the plurality of fingers.

(21)

The electronic equipment according to (20), in which a combination of the plurality of fingers varies on the basis of required authentication accuracy.

(22)

The electronic equipment according to any of (4) to (21), in which
the information processing unit detects finger information and accumulates the fingerprint information during execution of authentication or during a time where authentication is not executed.

(23)

The electronic equipment according to (22), in which the information processing unit accumulates a change of a finger and enhances authentication accuracy.

(24)

The electronic equipment according to (22) or (23), in which the information processing unit acquires and accumulates the fingerprint information of a finger other than a non-registered finger.

(25)

The electronic equipment according to any of (5) to (24), in which the number of light-receiving elements in a direction intersecting a direction of the swipe motion is larger than the number of light-receiving elements in the direction of the swipe motion.

(26)

The electronic equipment according to (25), in which the number of light-receiving elements in the direction intersecting the direction of the swipe motion is more than twice the number of light-receiving elements in the direction of the swipe motion.

(27)

The electronic equipment according to (25) or (26), in which a guide of execution of the swipe motion in a direction intersecting a direction in which a large number of the light-receiving elements are provided is displayed on the display.

(28)

The electron equipment according to any of (5) to (27), further including:

an interface that displays, on the display, a region including the light-receiving element, disposes product information and a purchase button so as to pass through the region, and enables purchase of the product by the swipe motion of the product information from the product information to the purchase button, in which the purchase information is transmitted to a server on the basis of a result of the fingerprint authentication.

(29)

The electronic equipment according to any of (1) to (27), in which a dynamic object is displayed on the display so as to include a region including the light-receiving element.

(30)

The electronic equipment according to (29), in which the object changes in shape when touched by a user's finger.

(31)

The electronic equipment according to (29), in which the object changes in light-emitting state when touched by a user's finger.

(32)

The electronic equipment according to (31), in which the light-emitting state changes to be suitable for acquisition of the fingerprint information.

(33)

The electronic equipment according to any of (29) to (32), in which the object dynamically changes on the basis of an acquisition status of the fingerprint information or a personal authentication status after a user's finger passes over.

(34)

The electronic equipment according to any of (1) to (33), further including:

an inclination detection unit that detects an inclination of the display from a horizontal direction, in which authentication of the fingerprint information is executed on the basis of the inclination detected by the inclination detection unit.

Aspects of the present disclosure are not limited to the above-described individual embodiments, but include various modifications that can be conceived by those skilled in the art, and the effects of the present disclosure are not limited to the above-described contents. That is, various additions, changes, and partial deletions can be made without departing from the conceptual idea and spirit of the present disclosure derived from the contents specified in the claims and equivalents thereof.

REFERENCE SIGNS LIST

1 Electronic equipment
2 Display unit
3 Camera module
4 Display panel
5 Circularly polarizing plate
6 Touch panel
7 Cover glass
8 Imaging unit
8a Photoelectric conversion unit
8b Pixel memory
9 Optical system
10 Information processing unit
100 A/D conversion unit
101 Clamp unit
102 Color-by-color output unit
103 Defect correction unit
104 Linear matrix unit
105 Frame memory
106 Authentication unit
107 Output unit
108 Velocity detection unit
109 Correction amount calculation unit
11 Storage unit

The invention claimed is:

1. Electronic equipment comprising:
a display including a display surface and light-emitting pixels arranged in an array in a first direction and a second direction intersecting the first direction;
an optical fingerprint sensor including an imaging element with light-receiving elements arranged in an array in the first direction and the second direction on a side opposite to the display surface of the display in a third direction intersecting the first direction and the second direction, wherein each of the light-receiving elements transfers a photoelectrically converted charge at a same timing;
a processor configured to execute information processing of fingerprint information read by the imaging element, wherein the processor reads the fingerprint information during an operation including at least a swipe motion of a finger; and
an interface that displays, on the display, a region including the light-receiving elements, arranges information of a product and a purchase button so as to pass through the region, and enables purchase of the product by the swipe motion of the information of the product from the information of the product to the purchase button, wherein
purchase information is transmitted to a server on a basis of a result of authentication using the fingerprint information.

2. The electronic equipment according to claim 1, wherein the imaging element includes pixel memory that temporarily stores light reception information of each of the light-receiving elements, and transfer of information from the light-receiving element to the pixel memory is executed at a same timing.

3. The electronic equipment according to claim 1, further comprising:
a touch panel that senses contact information with respect to the display, wherein
a velocity of the swipe motion is estimated on the touch panel.

4. The electronic equipment according to claim 3, wherein an instruction to slow down the velocity of the swipe motion is output on a basis of required authentication accuracy.

5. The electronic equipment according to claim 4, wherein the instruction of the velocity of the swipe motion is output to the display.

6. The electronic equipment according to claim 5, wherein an output indicating that the velocity of the swipe motion is too fast is at least one of an output to the display, an output with a sound, or an output with vibration.

7. The electronic equipment according to claim 3, wherein the processor shortens an exposure time of the optical fingerprint sensor in a case where the velocity of the swipe motion is faster than a predetermined velocity.

8. The electronic equipment according to claim 1, wherein the processor estimates a velocity of the swipe motion on a basis of information read by the imaging element.

9. The electronic equipment according to claim 1, wherein the processor generates authentication information from the fingerprint information captured at different times.

10. The electronic equipment according to claim 9, wherein
the light-emitting pixel outputs light of different wavelengths on a display surface side of the light-receiving element, and
the light-receiving element acquires the fingerprint information on a basis of reflected light of different wavelengths.

11. The electronic equipment according to claim 9, further comprising:
a polarizing filter between the light-receiving element and the display surface, wherein
the light-receiving element senses polarized light via the polarizing filter.

12. The electronic equipment according to claim 9, further comprising:
a filter that acquires a state of hemoglobin between the light-receiving element and the display surface, wherein
the processor acquires information of the hemoglobin and performs biometric authentication.

13. The electronic equipment according to claim 9, wherein the processor performs biometric authentication on a basis of information of a temporal shape change of the finger in contact with the display surface.

14. The electronic equipment according to claim 1, wherein the finger is one of a plurality of fingers, and the light-receiving element detects the swipe motion of the plurality of fingers.

15. The electronic equipment according to claim 14, wherein the processor executes authentication on a basis of the fingerprint information using a combination of the plurality of fingers in the swipe motion of the plurality of fingers.

16. The electronic equipment according to claim 1, wherein the processor detects finger information and accumulates the fingerprint information during execution of authentication or during a time where authentication is not executed.

17. The electronic equipment according to claim 1, wherein a number of the light-receiving elements in a direction intersecting a direction of the swipe motion is larger than a number of the light-receiving elements in the direction of the swipe motion.

* * * * *